(12) United States Patent
Shimojo et al.

(10) Patent No.: US 7,181,330 B2
(45) Date of Patent: Feb. 20, 2007

(54) CONTROL APPARATUS

(75) Inventors: Kanako Shimojo, Saitama-ken (JP); Yuji Yasui, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/349,140

(22) Filed: Feb. 8, 2006

(65) Prior Publication Data

US 2006/0217871 A1 Sep. 28, 2006

(30) Foreign Application Priority Data

Feb. 23, 2005 (JP) ............................. 2005-047831

(51) Int. Cl.
*F02D 45/00* (2006.01)
*G05B 13/02* (2006.01)
*G06F 19/00* (2006.01)
(52) U.S. Cl. ...................... 701/102; 123/90.15; 700/38
(58) Field of Classification Search ................ 701/102, 701/115, 101; 123/90.15, 90.17; 700/28, 700/29, 38, 40
See application file for complete search history.

(56) References Cited

U.S. PATENT DOCUMENTS

| 6,661,363 | B2* | 12/2003 | Zierhofer | .................... 341/143 |
| 2003/0000489 | A1 | 1/2003 | Majima et al. | |
| 2005/0203642 | A1* | 9/2005 | Yasui | .................... 701/102 |
| 2005/0216179 | A1* | 9/2005 | Yasui | .................... 701/115 |

FOREIGN PATENT DOCUMENTS

EP  1 418 326 A2  5/2004

\* cited by examiner

*Primary Examiner*—Hieu T. Vo
(74) *Attorney, Agent, or Firm*—Arent Fox PLLC

(57) ABSTRACT

A control apparatus is provided for ensuring a high-level control resolution and a high control accuracy even when a plant exhibits strong and varying non-linear characteristics with a varying sensitivity of a control amount to a control input. The control apparatus for controlling a cam phase through a cam phase varying mechanism comprises an ECU. The ECU calculates an SLD control input for controlling a cam phase to converge to a target cam phase in accordance with a predetermined control algorithm, and calculate a control input to the cam phase varying mechanism by modulating the SLD control input in accordance with a predetermined modulation algorithm. The ECU also sets an amplitude setting value in accordance with the cam phase, an engine rotational speed, an oil pressure, and an oil temperature.

7 Claims, 18 Drawing Sheets

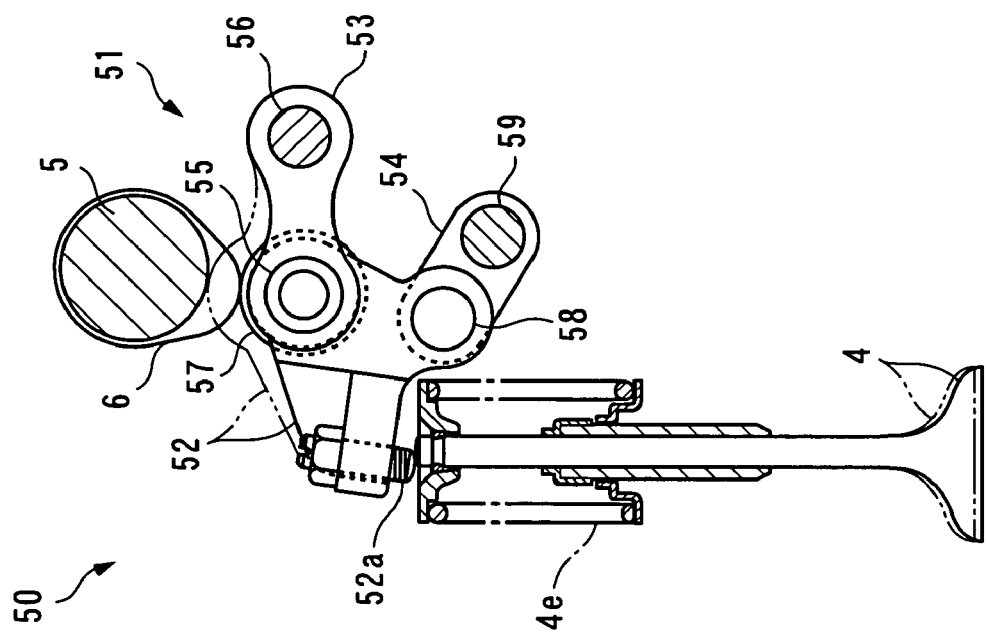
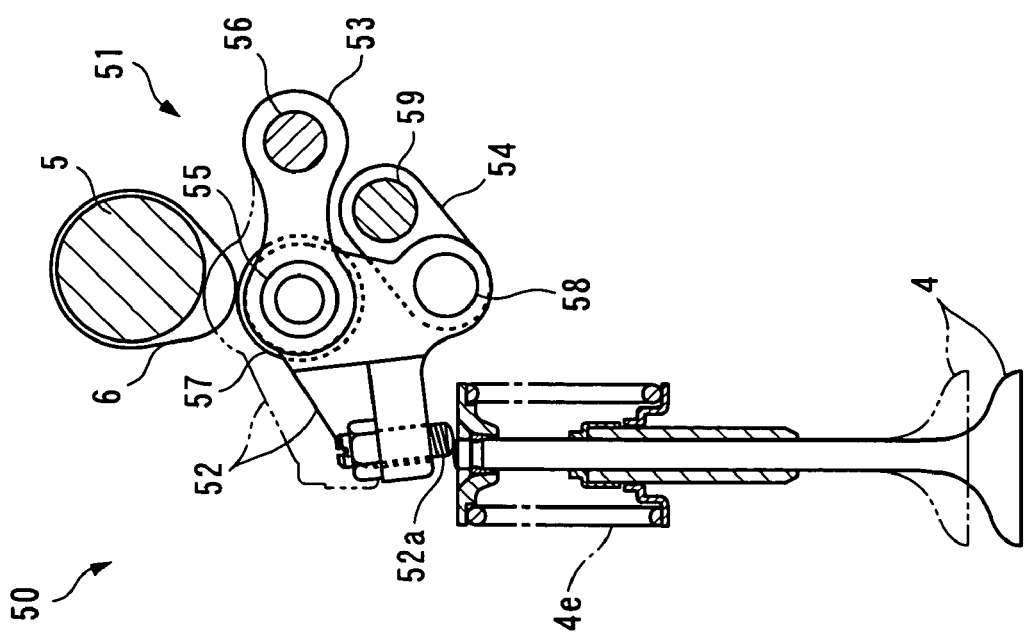

F I G. 1 1
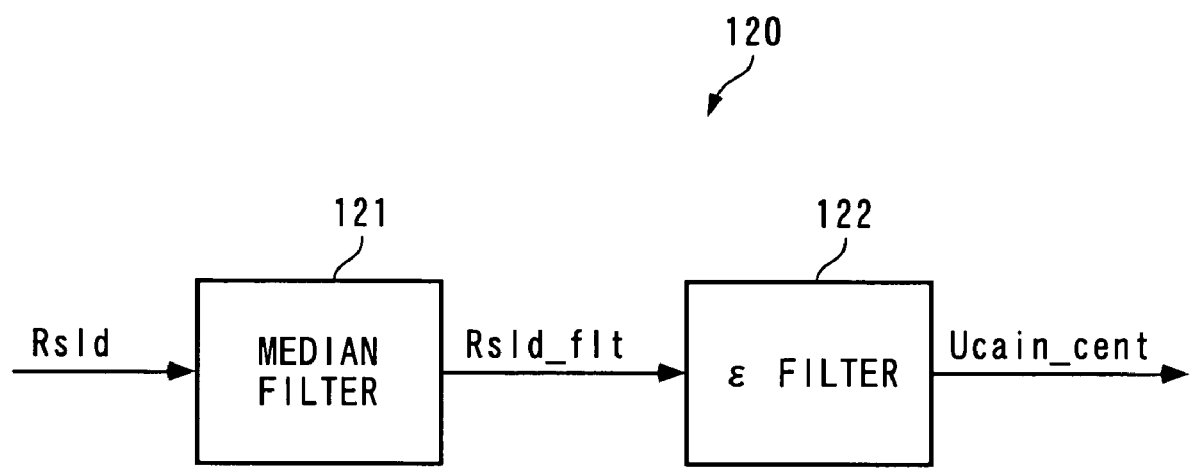

CONTROL APPARATUS

BACKGROUND OF THE INVENTION

1. Field of the Invention

The present invention relates to a control apparatus for controlling a plant which has non-linear characteristics such as hysteresis, dead band and the like.

2. Description of the Prior Art

A known control apparatus of the type mentioned above is disclosed, for example, in Laid-open Japanese Patent Application No. 2001-132482. This control apparatus controls a cam phase varying mechanism as a plant. The cam phase varying mechanism freely varies the phase relative to a crank shaft (hereinafter called the "cam phase") of an intake cam in an internal combustion engine, and is hydraulically driven by an oil pressure supplied from an oil pump. Also, the control apparatus comprises a crank angle sensor and a cam angle sensor for detecting signals corresponding to angular positions of the crank shaft and the intake cam, respectively, and a controller which receives detection signals of these sensors.

This controller calculates an actual cam phase based on the detection signals of the crank angle sensor and the cam angle sensor, calculates a target cam phase based on the operating condition of the internal combustion engine, and calculates a control input to the cam phase varying mechanism in accordance with a sliding mode control algorithm to control the cam phase to converge to the target cam phase.

It is generally known that the above-mentioned hydraulically driven cam phase varying mechanism, when regarded as a plant, has strong non-linear characteristics such as hysteresis, dead band and the like. In contrast, the control apparatus described in Laid-open Japanese Patent Application No. 2001-132482 calculates a control input in accordance with the sliding mode control apparatus, so that when this control apparatus controls a plant having strong non-linear characteristics, i.e., a hydraulically driven cam phase varying mechanism, the control apparatus fails to control the cam phase with the control input in small changing steps, due to the strong non-linear characteristics, and therefore suffers from problems of a low resolution of control and a low accuracy of control.

The present applicant has proposed a control apparatus which can solve the problems of the control apparatus as described above, in Laid-open Japanese Patent Application No. 2005-63177. This control apparatus controls an electro-magnetically driven cam phase varying mechanism, and comprises a two-degree-of-freedom sliding mode controller and a DSM controller. The two-degree-of-freedom sliding mode controller calculates a control value for a cam phase to converge to a target com phase in accordance with a target value filter type two-degree-of-freedom sliding mode control algorithm. The DSM controller in turn modulates the calculated control value in accordance with an algorithm to which a $\Delta\Sigma$ modulation algorithm is applied to calculate a control input to the cam phase varying mechanism such that the control input frequently repeats inversions over a predetermined amplitude centered at a predetermined value. As a result, even for controlling a cam phase varying mechanism having strong non-linear characteristics, the control apparatus can control the cam phase in small changing steps in response to the control input, which frequently repeats inversions, while compensating for the non-linear characteristics to improve the resolution of the control.

The cam phase varying mechanism has the nature of varying the non-linear characteristics as an internal combustion engine varies in the operating condition. Particularly, when the cam phase is changed, the non-linear characteristics tend to vary because the cam phase varying mechanism is affected by a cam counter-force and sprocket fluctuations (i.e., fluctuations in chain speed or fluctuations in crank angular speed). For example, as the cam counter-force or the sprocket fluctuations become larger, the cam counter-force or the sprocket fluctuations themselves act to change the cam phase, often resulting in such a change that increases the sensitivity of the cam phase to the control input when the cam phase is changed. If the internal combustion engine becomes instable in combustion condition in the manner mentioned above, a change in the cam counter-force or the sprocket fluctuations would cause a change in the sensitivity of the cam phase to the control input in the variable cam phase mechanism. Also, when an oil pressure is supplied from a hydraulic pump which is driven by the torque of the internal combustion engine in the hydraulically driven cam phase varying mechanism, fluctuations in the rotational speed of the engine would cause a change in the oil pressure supplied to the cam phase varying mechanism, thereby leading to changes in the sensitivity of the cam phase to the control input and in the frequency stability of the control input as well as an additional change in the non-linear characteristics.

When an attempt is made to compensate the cam phase varying mechanism as described above for a change in the non-linear characteristics, the control apparatus described in Laid-open Japanese Patent Application No. 2005-63177 can compensate for the change in the non-linearity by setting the amplitude of the control input to a larger value under conditions in which the non-linear characteristics present a larger change. In this strategy, however, the inverted state of the control input is reflected to the cam phase as a control amount just like noise under conditions in which the sensitivity of the control amount is degraded with respect to the control input, particularly under conditions in which the frequency sensitivity is degraded, more specifically under conditions in which a high frequency shut-off characteristic is degraded, possibly resulting in a lower resolution of control, to the contrary, and a lower accuracy of control.

SUMMARY OF THE INVENTION

The present invention has been made to solve the problems as mentioned above, and it is an object of the invention to provide a control apparatus which is capable of ensuring the resolution of control at a high level to ensure a high accuracy of control even when a plant has high and varying non-linear characteristics with the sensitivity of a control amount varying with respect to a control input.

To achieve the above object, according to a first aspect of the present invention, there is provided a control apparatus for controlling a control amount for a plant in response to a control input. The control apparatus is characterized by comprising control amount detecting means for detecting the control amount; target value setting means for setting a target value for the control amount; control value calculating means for calculating a control value for controlling the detected control amount to bring the same to the set target value based on a predetermined control algorithm; and control input calculating means for calculating the control input by modulating the calculated control value in accordance with an algorithm to which a predetermined modulation algorithm is applied, wherein the control input calculating means includes amplitude setting means for setting the amplitude of the control input in accordance with a parameter representative of the state of the plant.

According to this control apparatus, the control value for controlling the detected control amount to bring the same to the set target value is calculated based on a predetermined control algorithm, and the control input is calculated by modulating the calculated control value in accordance with an algorithm to which a predetermined modulation algorithm is applied, so that even when the plant exhibits strong non-linear characteristics, the non-linear characteristics can be compensated for by the modulated control input. In addition to this, since the amplitude of the control input is set in accordance with a parameter representative of the state of the plant, the amplitude of the control input can be appropriately set in accordance with the degree of change in the non-linear characteristics of the plant and the sensitivity of the control amount to the control input even if the non-linear characteristics and the sensitivity change in response to a change in the state of the plant. From the foregoing, even when the non-linear characteristics of the plant are strong and varying, and the sensitivity of the control amount to the control input changes, it is possible to ensure a high-level control resolution and a high control accuracy ("calculation" in "calculation of the control value," "calculation of the control input" and the like in this specification is not limited to program-based operations but includes the generation of electric signals indicative of them in hardware as well).

Also, to achieve the above object, according to a second aspect of the present invention, there is provided a control apparatus for controlling a cam phase of at least one of an intake cam and an exhaust cam in an internal combustion engine relative to a crank shaft through a cam phase varying mechanism. The control apparatus is characterized by comprising cam phase detecting means for detecting the cam phase; target cam phase setting means for setting a target cam phase for the cam phase; control value calculating means for calculating a control value for controlling the detected cam phase to bring the same to the set target cam phase based on a predetermined control algorithm; and control input calculating means for calculating a control input to the cam phase varying means by modulating the calculated control value in accordance with an algorithm to which a predetermined modulation algorithm is applied, wherein the control input calculating means includes an amplitude setting means for setting the amplitude of the control input in accordance with an operating condition parameter representative of an operating condition of the internal combustion engine.

As described above, the cam phase varying mechanism exhibits strong non-linear characteristics, and the non-linear characteristics and a response of the cam phase to the control input vary in accordance with the operating condition of the internal combustion engine such as the engine rotational speed. For example, when a cam phase is changed, a change in cam counter-force or sprocket fluctuations, if produced in association with a change in the operating condition of the internal combustion engine, results in a change in the sensitivity of the cam phase to the control input. In contrast, according to the control apparatus of the second aspect, the control value for controlling the cam phase to converge to the target cam phase is calculated based on a predetermined control algorithm, and the control input to the cam phase varying mechanism is calculated by modulating the control value in accordance with an algorithm to which a predetermined modulation algorithm is applied, thus making it possible to compensate for the strong non-linear characteristics of the cam phase varying mechanism. In addition to this, the amplitude of the control input is set in accordance with the parameter representative of the operating condition of the internal combustion engine, so that even if the non-linear characteristics and the sensitivity of the cam phase to the control input change following a change in the operating condition of the internal combustion engine, the amplitude of the control input can be appropriately set in accordance with the degree of the change in the non-linear characteristics and the sensitivity. From the foregoing, when the cam phase is controlled through the cam phase varying mechanism, it is possible to ensure a high-level control resolution and a high control accuracy ("detection of the cam phase" in this specification is not limited to a direct detection by a sensor, but includes a calculation or an estimation as well).

Preferably, in the control apparatus of the second aspect described above, the internal combustion engine comprises a variable valve lift mechanism for changing a lift of a valve which is driven to open and close by at least one of the intake cam and the exhaust cam for which the cam phase is controlled, and the amplitude setting means sets the amplitude of the control input in accordance further with the lift of the valve.

Generally, in a situation where the cam phase of at least one of the intake cam and the exhaust cam is controlled through the cam phase varying mechanism, if the lift of the valve is changed by a variable valve lift mechanism, the sensitivity of the cam phase to the control input changes by the influence of the changed lift in the cam phase varying mechanism. On the other hand, according to this preferred embodiment of the control apparatus of the second aspect, the amplitude of the control input is set further in accordance with the lift of the valve, so that even when the lift of the valve is changed by the variable valve lift mechanism, the amplitude of the control input can be appropriately set in accordance with the degree of an associated change in the sensitivity of the cam phase to the control input. As a result, it is possible to further improve the resolution of the control and the control accuracy.

Preferably, in the control apparatuses described above, the control input calculating means further includes center value setting means for setting a center value located at the center of the amplitude of the control input in accordance with the control value.

Assuming that the control input is calculated by modulating the control value as in the control apparatuses described above, if a predicted control value largely varies over a wide range during the control, i.e., if there is a large difference between a maximum value and a minimum value which can be taken by the control value, the amplitude of the control input must be set to a large value which covers a range over which the control value can vary. In doing so, an inverting state of the control input is reflected to the control amount or the cam phase just like noise under the condition that the control amount or cam phase suffers from a lower responsibility to the control input, possibly resulting in a lower control resolution and a lower control accuracy, as described above. In contrast, according to this preferred embodiment of the control apparatus of the first or second aspect, the center value located at the center of the amplitude of the control input is set in accordance with the control value, so that even if the control value largely varies in the control, the control input is only required to be calculated as a value which covers the control value at that control timing, thus making it possible to set the amplitude of the control input to a value smaller than that when it covers the entire range over which the control value can vary. As a result, when the plant exhibits strong and varying non-linear characteristics, and the control amount experiences a change in the sensitivity to the control input, the control apparatus according to the first aspect can ensure a high-level control resolution and a high control accuracy even if the control value largely varies during the control. In the control apparatus according to the second aspect, in turn, when the cam phase varying mechanism exhibits strong and varying non-linear characteristics, and the cam phase experiences a change in the sensitivity to the control input, it is possible to ensure a high-level control resolution and a high control accuracy even if the control value largely varies.

Preferably, in the control apparatuses described above, the predetermined modulation algorithm is any of a $\Delta\Sigma$ modulation algorithm, a $\Sigma\Delta$ modulation algorithm, and a $\Delta$ modulation algorithm.

According to this preferred embodiment of the control apparatuses, the control input is calculated by modulating the control value in accordance with an algorithm to which one of the $\Delta\Sigma$ modulation algorithm, the $\Sigma\Delta$ modulation algorithm, and the $\Delta$ modulation algorithm is applied. In this event, any of the $\Delta\Sigma$ modulation algorithm, the $\Sigma\Delta$ modulation algorithm, and the $\Delta$ modulation algorithm has characteristics that as a value inputted to these modulation algorithm approaches more to zero, a value calculated in accordance with these modulation algorithm inverts at a higher frequency. On the other hand, since the control value is used for controlling the control amount to converge to the target value in the control apparatus according to the first aspect, the control value varies less as the control amount approaches more to the target value. In the control apparatus according to the second aspect, on the other hand, since the control value is used for controlling the cam phase to converge to the target cam phase, the control value varies less as the cam phase approaches more to the target phase. Therefore, in the algorithm to which one of the $\Delta\Sigma$ modulation algorithm, the $\Sigma\Delta$ modulation algorithm, and the $\Delta$ modulation algorithm is applied, by setting the value inputted to one of the $\Delta\Sigma$ modulation algorithm, the $\Sigma\Delta$ modulation algorithm, and the $\Delta$ modulation algorithm to approach more to zero as the control value less varies, the control apparatus according to the first aspect can calculate a control input such that its inversion frequency is higher as the control amount approaches more to the target value, while the control apparatus according to the second aspect can calculate a control input such that its inversion frequency is higher as the cam phase approaches more to the target cam phase. As a result, the control apparatus according to the first aspect can enhance the convergence of the control amount to the target value, while the control apparatus according to the second aspect can enhance the convergence of the cam phase to the target cam phase, as compared with the calculation of a control input using PWM or dither at a constant inversion frequency.

BRIEF DESCRIPTION OF THE DRAWINGS

FIGS. 6A and 6B are diagrams illustrating an opening state of an intake valve when a lower link of the variable valve lift mechanism is situated at the maximum lift position (FIG. 6A), and an opening state of the intake valve when the lower link is situated at the minimum lift position (FIG. 6B), respectively;

FIG. 11 is a block diagram generally illustrating a non-linear filter;

DETAILED DESCRIPTION OF THE EMBODIMENTS

Figure 2:
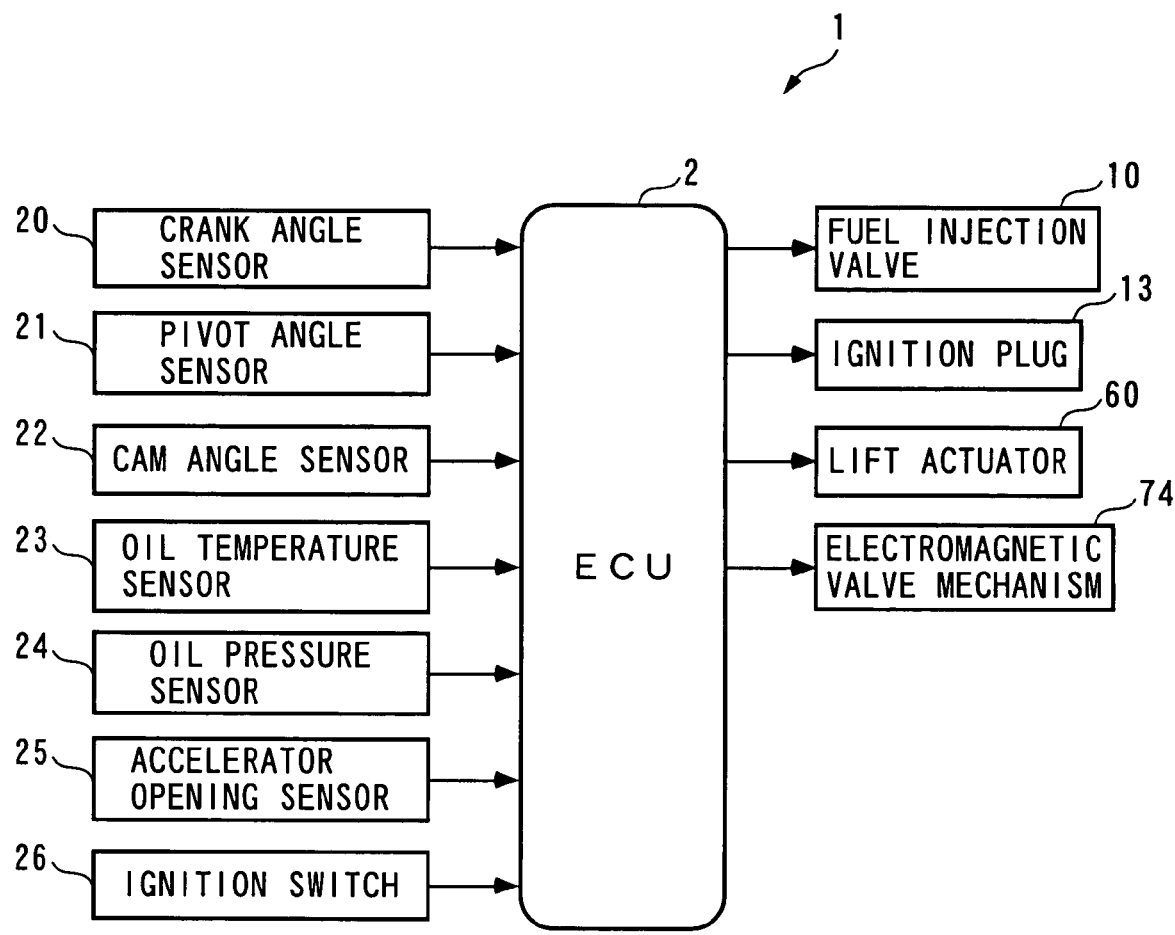
FIG. 2 is a diagram schematically illustrating the general configuration of the control apparatus.

In the following, a control apparatus for an internal combustion engine according to a first embodiment of the present invention will be described with reference to the accompanying drawings. As illustrated in FIG. 2, the control apparatus 1 comprises an ECU 2 for executing a variety of control routines such as a cam phase control routine in response to a particular operating condition of an internal combustion engine (hereinafter called the "engine") 3.

Figure 1:
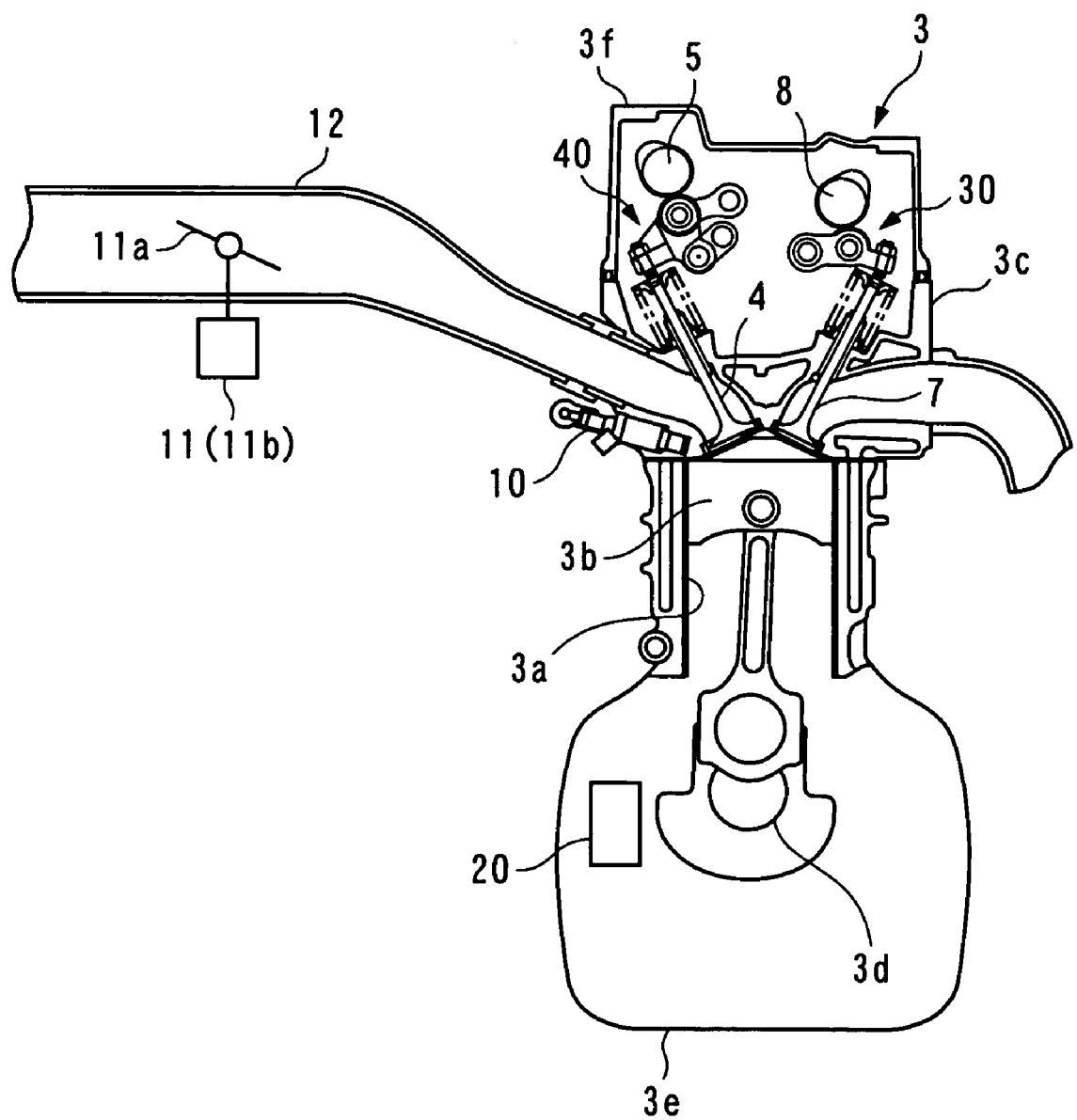
FIG. 1 is a diagram generally illustrating the configuration of an internal combustion engine to which a control apparatus is applied according to a first embodiment of the present invention.
Figure 3:
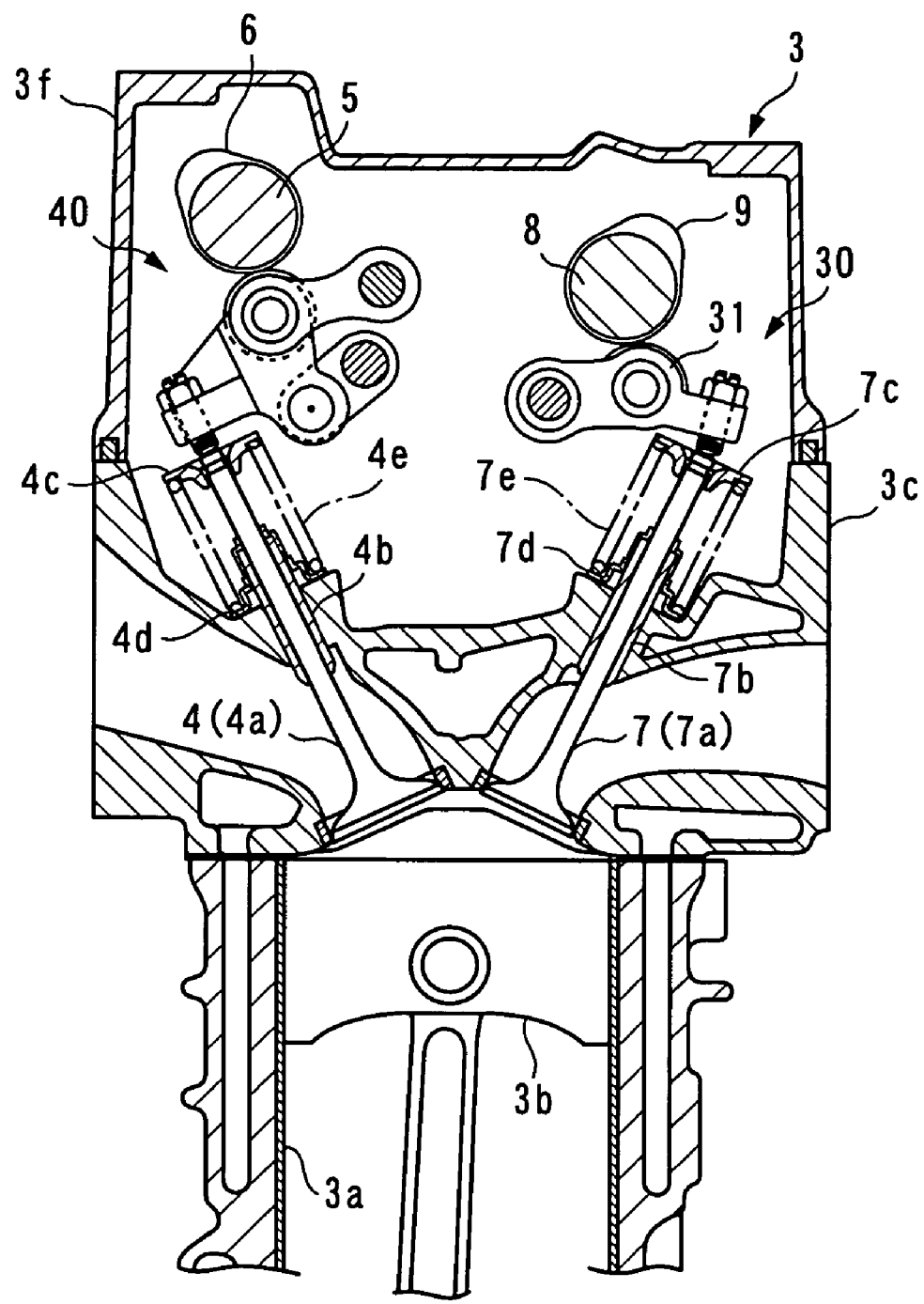
FIG. 3 is a cross-sectional view generally illustrating the configuration of a variable intake valve actuating mechanism and an exhaust valve actuating mechanism of the internal combustion engine.

As illustrated in FIGS. 1 and 3, the engine 3, which may be an in-line four-cylinder gasoline engine, is equipped in a vehicle (not shown). The engine 3 comprises, for each of cylinders 3a, an intake valve 4 for opening/closing an intake port; an exhaust valve 7 for opening/closing an exhaust port; an intake cam shaft 5 and an intake cam 6 for driving the intake valve 4; a variable intake valve actuating mechanism 40 for driving the intake valve 4 to open and close; an exhaust cam shaft 8 and an exhaust cam 9 for driving the exhaust valve 7; an exhaust valve actuating mechanism 30 for driving the exhaust valve 7 to open and close; a fuel injection valve 10; an ignition plug 13 (see FIG. 2); and the like.

Figure 4:
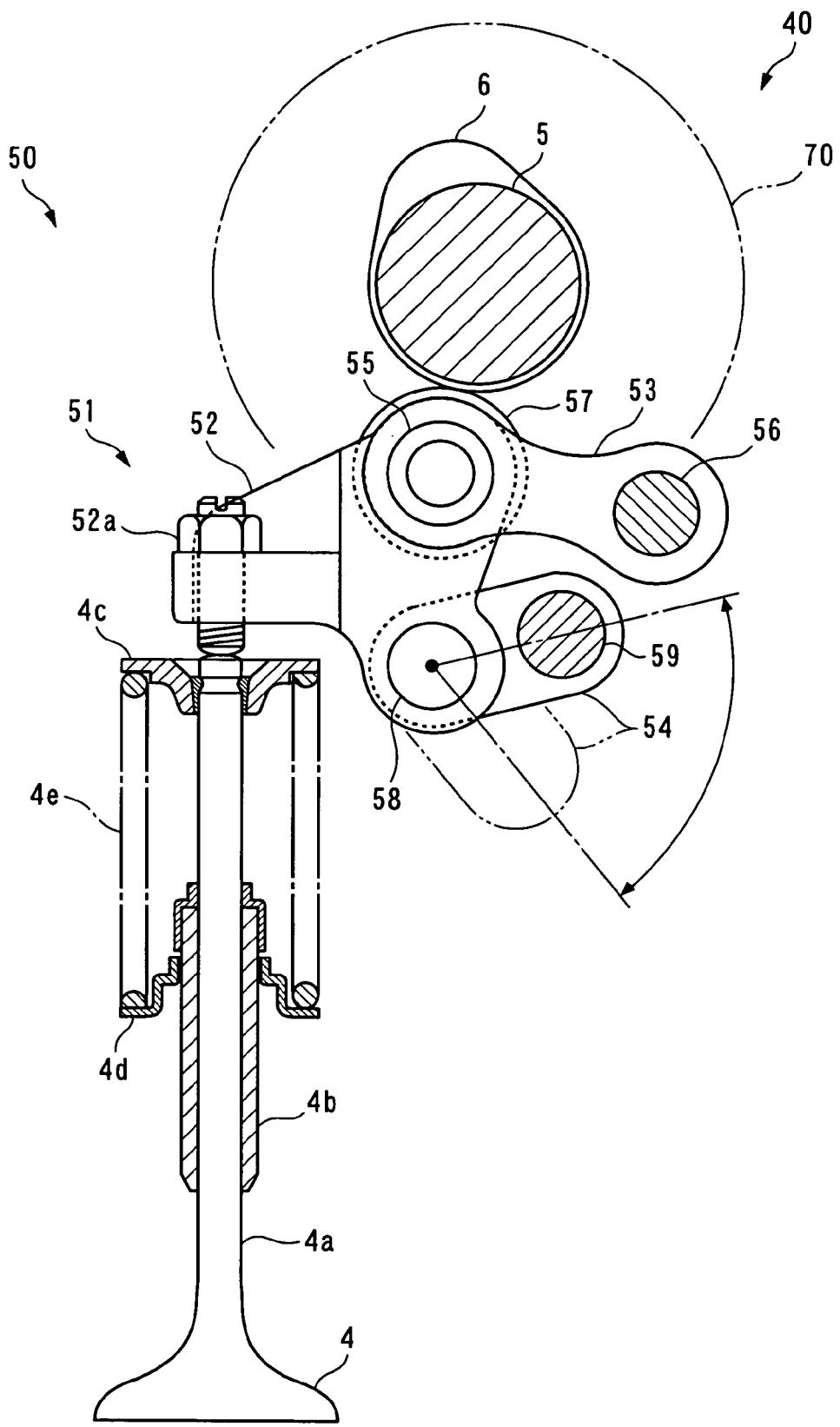
FIG. 4 is a cross-sectional view generally illustrating the configuration of a variable valve lift mechanism of the variable intake valve actuating mechanism.

The intake valve 4 has a stem 4a slidably fitted in a guide 4b, and the guide 4b is fixed to a cylinder head 3c. Also, as illustrated in FIG. 4, the intake valve 4 comprises an upper and a lower spring seat 4c, 4d, and a valve spring 4e arranged between the upper and lower spring sheets 4c, 4d, and the intake valve 4 is urged in a valve opening direction by the valve spring 4e.

The intake cam shaft 5 and the exhaust cam shaft 8 are rotatably attached to the cylinder head 3c, respectively, through holders, not shown. An intake sprocket (not shown) is coaxially disposed on one end of the intake cam shaft 5, and rotatably arranged. The intake sprocket is coupled to a crank shaft 3d through a timing chain, not shown, and coupled to the intake cam shaft 5 through a cam phase varying mechanism 70, later described. With the foregoing configuration, the intake cam shaft 5 rotates once each time the crank shaft 3d rotates twice. The intake cam 6 is provided on the intake cam shaft 5 for each cylinder 3a such that the intake cam 6 rotates integrally with the intake cam shaft 5.

The variable intake valve actuating mechanism 40 drives the intake valve 4 of each cylinder 3a to open and close in association with the rotation of the intake cam shaft 5, and changes a lift and a valve timing of the intake vale 4 in a stepless manner, details of which will be described later. In this embodiment, the "lift of the intake valve 4" (hereinafter called the "valve lift") represents a maximum lift of the intake valve 4.

The exhaust valve 7 in turn has its stem 7a slidably fitted in a guide 7b, and the guide 7b is fixed to the cylinder head 3c. The exhaust valve 7 further comprises an upper and a lower spring 7c, 7d, and a valve spring 7e arranged between the upper and lower springs 7c, 7d, and the exhaust valve 7 is urged in a valve closing direction by the valve spring 7e.

The exhaust cam shaft 8 comprises an exhaust sprocket (not shown) integrated therewith, and is coupled to the crank shaft 3d through the exhaust sprocket and a timing chain, not shown, such that it rotates once each time the crank shaft 3d rotates twice. Further, the exhaust cam 9 is provided on the exhaust cam shaft 8 for each cylinder 3a such that it rotates integrally with the exhaust cam shaft 8.

The exhaust valve actuating mechanism 30 comprises a rocker arm 31 which rocks in association with the rotation of the exhaust cam 9 of the rocker arm 31, thereby driving the exhaust valve 7 to open and close against an urging force of the valve spring 7e.

The fuel injection valve 10, on the other hand, is provided for each cylinder 3a, and is obliquely attached to the cylinder head 3c to directly inject a fuel into a combustion chamber. In other words, the engine 3 is configured as a direct injection engine. The fuel injection valve 10 is electrically connected to the ECU 2, and controlled by the ECU 2 in terms of a valve opening time period and a valve opening timing, thereby controlling the amount of injected fuel.

The ignition plug 13 is also provided for each cylinder 3a, and is attached to the cylinder head 3c. The ignition plug 13 is electrically connected to the ECU 2, and is controlled in terms of a discharging state by the ECU 2 such that an air/fuel mixture is burnt within the fuel chamber at a timing in step with an ignition timing.

The engine 3, on the other hand, is provided with a crank angle sensor 20. The crank angle sensor 20, which comprises a magnet rotor and an MRE pickup, outputs a CRK signal and a TDC signal, both of which are pulse signals, to the ECU 2 in association with the rotation of the crank shaft 3d. The CRK signal is outputted one pulse per predetermined crank angle (for example, every 10°), so that the ECU 2 calculates a rotational speed NE of the engine 3 (hereinafter called the "engine rotational speed") based on the CRK signal. The TDC signal in turn is a signal which indicates that the piston 3b of each cylinder 3a is situated at a predetermined crank angle position slightly in front of a TDC position of an intake stroke, and is generated one pulse per predetermined crank angle. It should be noted that in this embodiment, the crank angle sensor 20 corresponds to control amount detecting means and cam phase detecting means, and the engine rotational speed NE corresponds to a parameter.

A throttle valve mechanism 11 is arranged in an intake pipe 12 of the engine 3. The throttle valve mechanism 11 comprises a throttle valve 11a, a TH actuator 11b for driving the throttle valve 11a to open and close, and the like. The throttle valve 11a is rotatably arranged halfway in the intake pipe 12 to change an air flow rate within the intake pipe 12 in response to a change in the opening resulting from the rotation thereof. The TH actuator 11b is a combination of a gear mechanism (not shown) with a motor (not shown) connected to the ECU 2, and is driven by a control input from the ECU 2 to change the opening of the throttle valve 11a.

The ECU 2 keeps the throttle valve 11a in a fully open state during a normal operation, and controls the opening of the throttle valve 11a when the variable intake valve actuating mechanism 40 fails or when a negative pressure is supplied to a master back (not shown).

Next, a description will be given of the variable intake valve actuating mechanism 40 described above. As illustrated in FIG. 4, the variable intake valve actuating mechanism 40 comprises an intake cam shaft 5, an intake cam 6, a variable valve lifting mechanism 50, a cam phase varying mechanism 70, and the like.

The variable valve lifting mechanism 50 drives the intake valve 4 to open and close in association with the rotation of the intake cam shaft 5, and varies a valve lift Liftin between a predetermined maximum value Liftinmax and a minimum value Liftinmin in a stepless manner. The variable valve lifting mechanism 50 comprises a four-node link type rocker arm mechanism 51 provided for each cylinder 3a, a lift actuator 60 (see FIG. 5) for simultaneously driving the rocker arm mechanisms 51, and the like. In this embodiment, the valve lift Liftin corresponds to a parameter.

Each rocker arm mechanism 51 comprises a rocker arm 52, and an upper and a lower link 53, 54, and the like. The upper link 53 has one end pivotably attached to an upper end of the rocker arm 52 through an upper pin 55, and the other end pivotably attached to a rocker arm shaft 56. The rocker arm shaft 56 is attached to the cylinder head 3c through a holder, not shown.

A roller 57 is rotatably arranged on the upper pin 55 of the rocker arm 52. The roller 57 is in contact with a cam surface of the intake cam 6, such that the rotation of the intake cam 6 causes the roller 57 to roll on the intake cam 6 while guided by the cam surface. In this way, the rocker arm 52 is driven in the vertical direction, and the upper link 53 pivotally moves about the rocker arm shaft 56.

Further, an adjuster bolt 52a is attached to an end portion of the rocker arm 52 close to the intake valve 4. The adjuster bolt 52a drives the stem 4a in the vertical direction to open and close the intake valve 4 against an urging force of the valve spring 4e as the rocker arm 52 moves up and down in association with the rotation of the intake cam 6.

The lower link 54 in turn has one end pivotably attached to the lower end of the rocker arm 52 through a lower pin 58, and a coupling shaft 59 is rotatably attached to the other end of the lower link 54. The lower link 54 is coupled to a short arm 65, later described, of the lift actuator 60 through the coupling shaft 59.

As illustrated in FIG. 5, the lift actuator 60 comprises a motor 61, a nut 62, a link 63, a long arm 64, a short arm 65, and the like. The motor 61 is connected to the ECU 2, and is arranged outside of a head cover 3f of the engine 3. The motor 61 has a rotating shaft which is a threaded shaft 61a formed with a male thread, and the nut 62 is in mesh with the threaded shaft 61a. The nut 62 is coupled to the long arm 64 through the link 63. The link 63 has one end pivotably attached to the nut 62, and the other end pivotably attached to one end of the long arm 64.

The long arm 64 has the other end attached to one end of the short arm 65 through a pivot shaft 66. The pivot shaft 66, which is formed in a circular cross section, extends through the head cover 3f of the engine 3, and is rotatably supported by the head cover 3f. With the rotation of the pivot shaft 66, the long arm 64 and the short arm 65 pivotally move integrally with the pivot shaft 66.

The short arm 65 has the other end to which the aforementioned coupling shaft 59 is rotatably attached, whereby the short arm 65 is coupled to the lower link 54 through the coupling shaft 59.

Next, a description will be given of the operation of the variable valve lift mechanism 50 configured as described above. In the variable valve lift mechanism 50, as a control input from the ECU 2 is applied to the lift actuator 60, the threaded shaft 61a rotates to associatively move the nut 62, causing the long arm 64 and the short arm 65 to pivotally move about the pivot shaft 66. Then, the pivotal movement of the short arm 65 causes the lower link 54 of the rocker arm mechanism 51 to pivotally move about the lower pin 58. In other words, the lower link 54 is driven by the lift actuator 60.

Figure 5A:
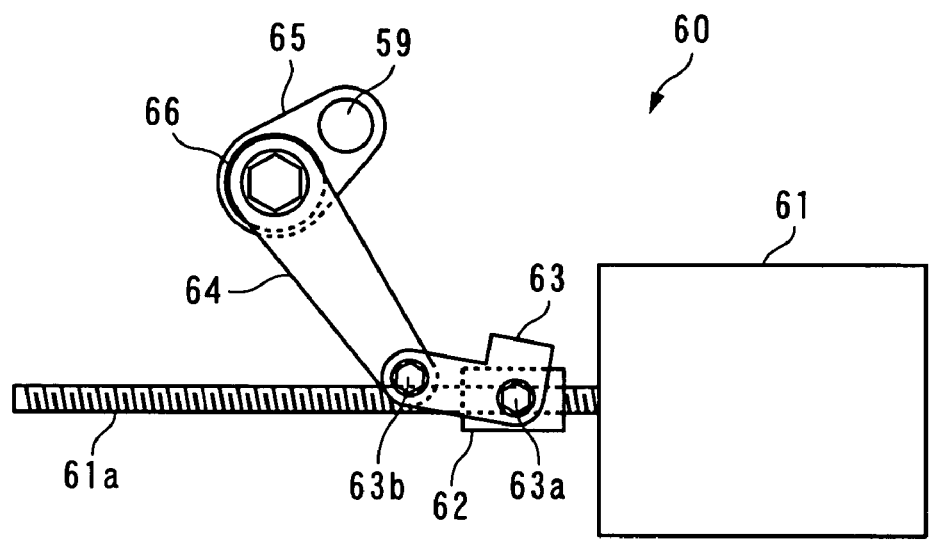
FIGS. 5A and 5B are diagrams illustrating a lift actuator which has a short arm situated at a maximum lift position (FIG. 5A) and at a minimum lift position (FIG. 5B), respectively.
Figure 5B:
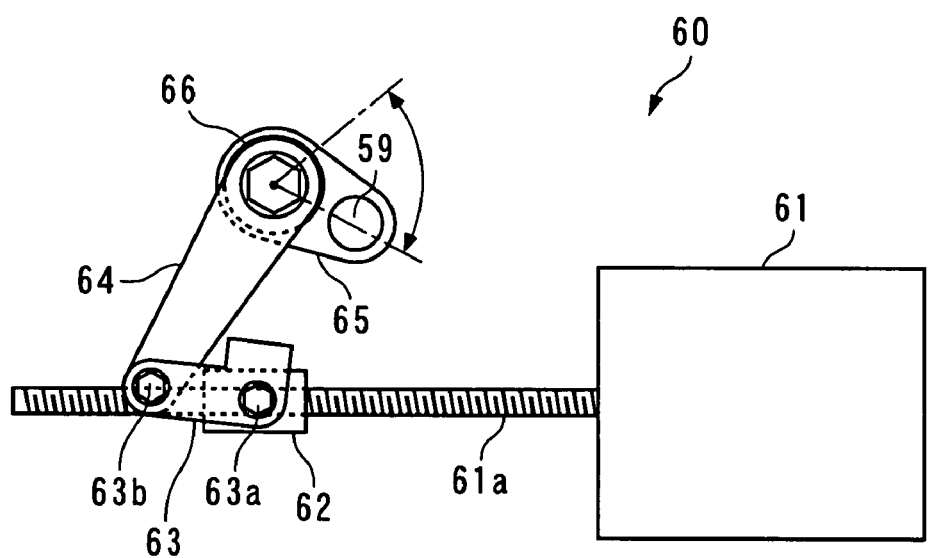

In this event, the short arm 65 is restricted in a range in which it can pivotally move between a maximum lift position shown in FIG. 5A and a minimum lift position shown in FIG. 5B, under control of the ECU 2, resulting in a similar restriction of a range in which the lower link 5 can pivotally move between a maximum lift position indicated by a solid line in FIG. 4 and a minimum lift position indicated by a two-dot chain line in FIG. 4.

The four-node link composed of the rocker arm shaft 56, the upper and lower pins 55, 58, and the coupling shaft 59 is configured such that when the lower link 54 is situated at the maximum lift position, the distance between the centers of the upper pin 55 and the lower pin 58 is longer than the distance between the centers of the rocker arm shaft 56 and the coupling shaft 59. Therefore, as illustrated in FIG. 6A, as the intake cam 6 rotates, the adjuster bolt 52a moves by an amount larger than a point of the intake cam 6 in contact with the roller 57.

On the other hand, when the lower link 54 is situated at the minimum lift position, the four-node link is configured such that the distance between the centers of the upper pin 55 and the lower pin 58 is shorter than the distance between the centers of the rocker arm shaft 56 and the coupling shaft 59. Therefore, as illustrated in FIG. 6B, as the intake cam 6 rotates, the adjuster bolt 52a moves by an amount smaller than the point of the intake cam 6 in contact with the roller 57.

Figure 7:
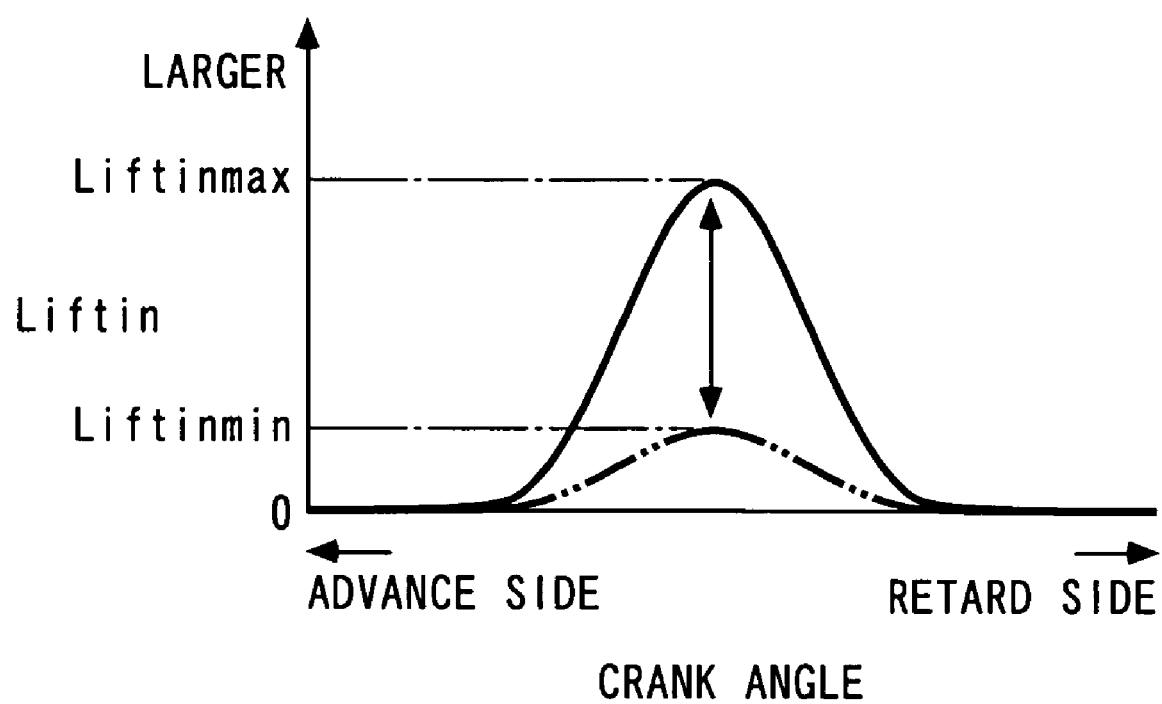
FIG. 7 is a graph showing a valve lift curve of the intake valve when the lower link of the variable valve lift mechanism is situated at the maximum lift position (solid line), and a valve lift curve when the lower link is situated at the minimum lift position (two-dot chain line), respectively.

For the reason described above, the intake valve 4 opens with a larger valve lift Liftin when the lower link 54 is situated at the maximum lift position than when it is situated at the minimum lift position. Specifically, during the rotation of the intake cam 6, the intake valve 4 opens in accordance with a valve lift curve indicated by a solid line in FIG. 7 when the lower link 54 is situated at the maximum lift position, where the valve lift Liftin presents its maximum value Liftinmax. On the other hand, when the lower link 54 is situated at the minimum lift position, the intake valve 4 opens in accordance with a valve lift curve indicated by a two-dot chain line in FIG. 7, where the valve lift Liftin presents its minimum value Liftinmin.

Therefore, in the variable valve lift mechanism 50, the valve lift Liftin can be varied in a stepless manner between the maximum value Liftinmax and the minimum value Liftinmin by pivotally moving the lower link 54 between the maximum lift position and the minimum lift position through the actuator 60.

The engine 3 is also provided with a pivot angle sensor 21 (see FIG. 2) which detects the angle over which the short arm 65 pivotally moves about the pivot shaft 66, and outputs its detection signal to the ECU 2. The ECU 2 calculates the valve lift Liftin based on the detection signal of the pivot angle sensor 21.

Figure 8:
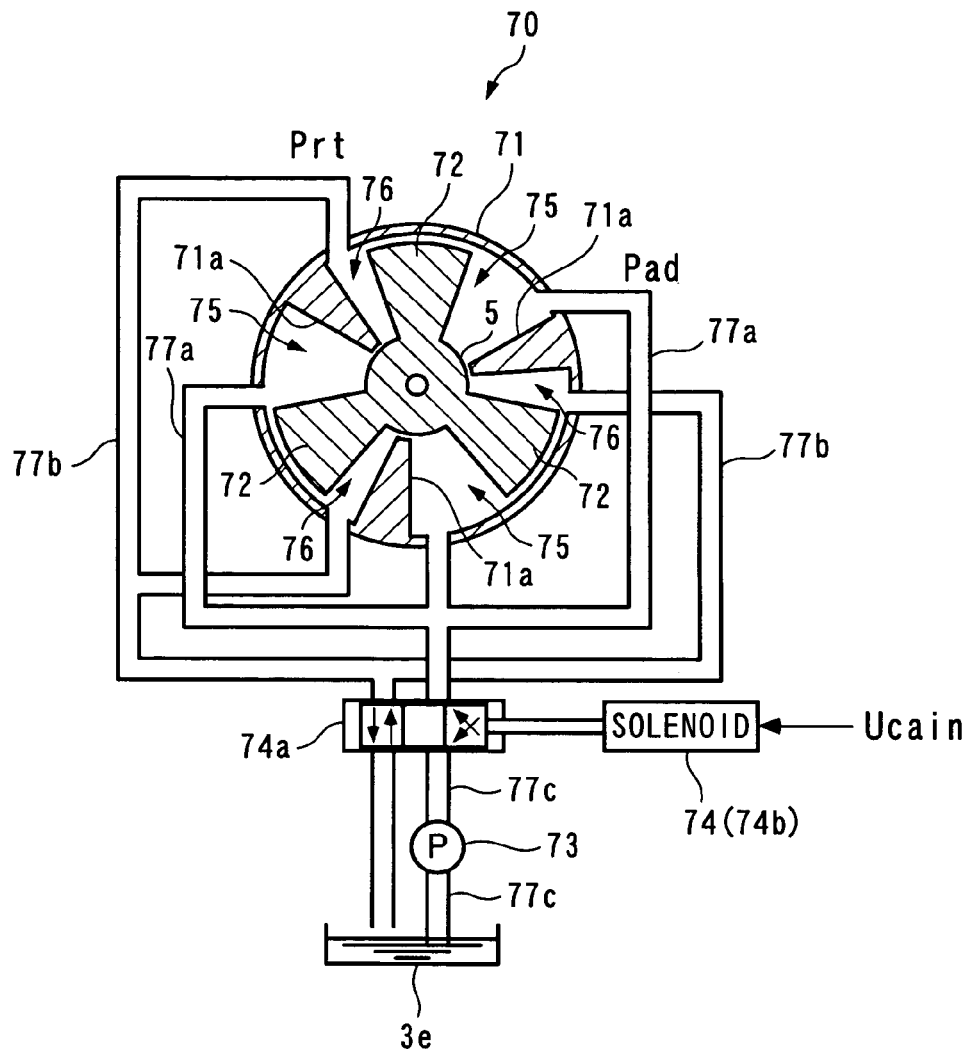
FIG. 8 s a diagram schematically illustrating the general configuration of a cam phase varying mechanism.

Next, a description will be given of the aforementioned cam phase varying mechanism 70. This cam phase varying mechanism 70 varies the phase Cain of the intake cam shaft 5 relative to the crank shaft 3d (hereinafter called the "cam phase") in a stepless manner in an advancing direction or a retarding direction, and is arranged at an end of the intake cam shaft 5 near the intake sprocket. As illustrated in FIG. 8, the cam phase varying mechanism 70 comprises a housing 71, a vane 72 having three blades, a hydraulic pump 73, an electromagnetic valve mechanism 74, and the like.

The housing 71 is in a single-piece construction with the intake sprocket on the intake cam shaft 5, and comprises three partitions 71a formed at equal intervals to each other. The vane 72 is coaxially attached to the intake cam shaft 5 closer to the intake sprocket, extends radially outwardly from the intake cam shaft 5, and is rotatably fitted in the housing 71. The housing 71 is also formed with three advance chambers 75 and three retard chambers 76 between the partitions 71a and the vane 72.

The hydraulic pump 73 is of a mechanical type, and is coupled to the crank shaft 3d. As the crank shaft 3d rotates, the hydraulic pump 73 sucks oil for lubrication stored in an oil pan 3e of the engine 3 through an oil path 77c, pressurizes the oil, and supplies the electromagnetic valve mechanism 74 with the pressurized oil through the oil path 77c.

The electromagnetic valve mechanism 74 is a combination of a spool valve mechanism 74a and a solenoid 74b which are connected to the advance chambers 75 and the retard chambers 76, respectively, through an advance oil path 77a and a retard oil path 77b. An oil pressure Poil supplied from the hydraulic pump 73 is outputted to the advance chambers 75 and the retard chambers 76, respectively, as an advance oil pressure Pad and a retard oil pressure Prt. The solenoid 74b of the electromagnetic valve mechanism 74 is electrically connected to the ECU 2. As the control input Ucain, later described, is applied to the solenoid 74b from the ECU 2, the solenoid 74b moves a spool valve body of the spool valve mechanism 74a within a predetermined movement range in accordance with the control input Ucain to change either of the advance oil pressure Pad and the retard oil pressure Prt.

Figure 9:
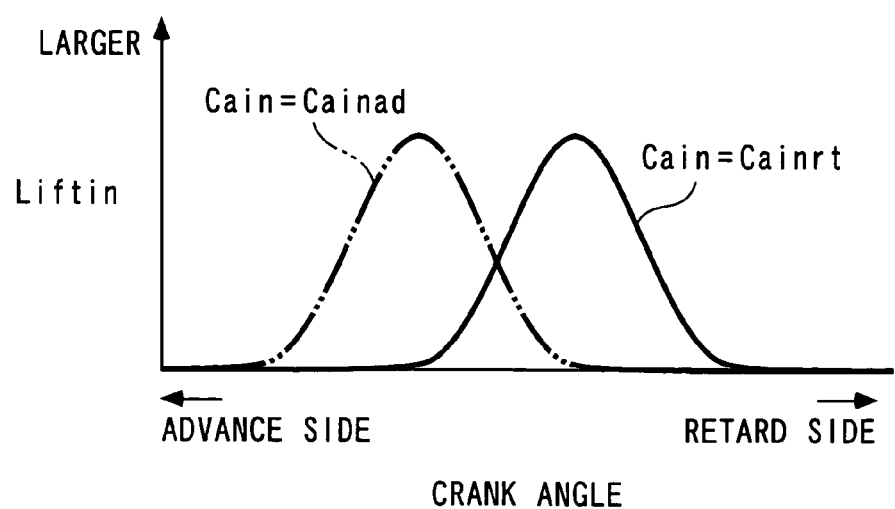
FIG. 9 is a diagram showing a valve lift curve of the intake valve when a cam phase is set at a maximum retard angle by the cam phase varying mechanism (solid line), and a valve lift curve of the intake valve when the cam phase is set at a maximum advance value (two-dot chain line)

In the foregoing cam phase varying mechanism 70, the electromagnetic valve mechanism 74 actuates in accordance with the control input Ucain during the operation of the hydraulic pump 73 to supply the advance oil pressure Pad to the advance chambers 75 and the retard oil pressure Prt to the retard chambers 76, respectively, resulting in a change in the relative angle between the vane 72 and the housing 71 in the advancing direction or in the retarding direction. As a result, the aforementioned cam phase Cain continuously varies between the maximum retard value Cainrt and the maximum advance value Cainad, thereby varying the valve timing of the intake valve 4 between a maximum retard timing indicated by a solid line in FIG. 9 and a maximum advance timing indicated by a two-dot chain line in FIG. 9. It should be noted that in a cam phase control, later described, the maximum retard value Cainrt is set to 0°, and the maximum advance value Cainad is set as a positive predetermined angle (for example, 90°).

In the foregoing manner, in the variable intake valve actuating mechanism 40 of this embodiment, the variable valve lift mechanism 50 varies the valve lift Liftin in a stepless manner, while the cam phase varying mechanism 70 varies the cam phase Cain, i.e., the valve timing of the intake valve 4 in a stepless manner between the aforementioned maximum retard timing and maximum advance timing.

A cam angle sensor 22 (see FIG. 2) is disposed on the end of the intake cam shaft 5 opposite to the variable cam phase mechanism 70. The cam angle sensor 22, which comprises, for example, a magnet rotor and an MRE pickup, outputs a CAM signal, which is a pulse signal, to the ECU 2 every predetermined cam angle (for example, 1°) in association with the rotation of the intake cam shaft 5. The ECU 2 calculates the cam phase Cain based on the CAM signal and the aforementioned CRK signal. In this embodiment, the cam angle sensor 22 corresponds to control amount detecting means and come phase detecting means, and the cam phase Cain corresponds to a control amount and a parameter.

Further, as illustrated in FIG. 2, an oil temperature sensor 23, an oil pressure sensor 24, an accelerator opening sensor 25, and an ignition switch (hereinafter called the "IG/SW") 26 are connected to the ECU 2. The oil temperature sensor 23 outputs a detection signal indicative of the temperature Toil of a lubricant oil (hereinafter called the "oil temperature") within the oil pan 3e to the ECU 2, while the oil pressure sensor 24 outputs a detection signal indicative of an oil pressure Poil supplied from the hydraulic pump 73 to the electromagnetic valve mechanism 74 to the ECU 2. In this embodiment, the oil temperature Toil and the oil pressure Poil correspond to parameters.

The accelerator opening sensor 25 outputs a detection signal indicative of the amount AP by which an accelerator pedal, not shown, of the vehicle is trodden (hereinafter called the "accelerator opening") to the ECU 2. The IG/SW 26 in turn is turned ON/OFF through manipulations of an ignition key (not shown), and outputs a signal indicative of its ON/OFF state to the ECU 2.

The ECU 2, which is based on a microcomputer that comprises a CPU, a RAM, a ROM, an I/O interface and the like (none of which is shown), determines the operating condition of the engine 3 in accordance with the detection signals from a variety of the aforementioned sensors 20–25, the ON/OFF signal of the IG/SW 26, and the like, and executes a variety of control routines. Specifically, the ECU 2 controls the cam phase Cain through the cam phase varying mechanism 70 in accordance with a particular operating condition of the engine 3, as later described.

Though a detailed description is omitted, the ECU 2 controls the valve lift Liftin through the variable valve lift mechanism 50. Specifically, the ECU 2 sets a target valve lift Liftin_cmd in accordance with the accelerator opening AP and the engine rotational speed NE, and controls the valve lift Liftin such that it converges the target valve lift Liftin_cmd. In this event, the target valve lift Liftin_cmd is set to a larger value as the accelerator opening AP is larger or as the engine rotational speed NE is higher, i.e., as the engine is more highly loaded.

In this embodiment, the ECU 2 corresponds to control amount detecting means, target value setting means, control value calculating means, control input calculating means, amplitude setting means, cam phase detecting means, target cam phase setting means, and center value setting means.

Figure 10:
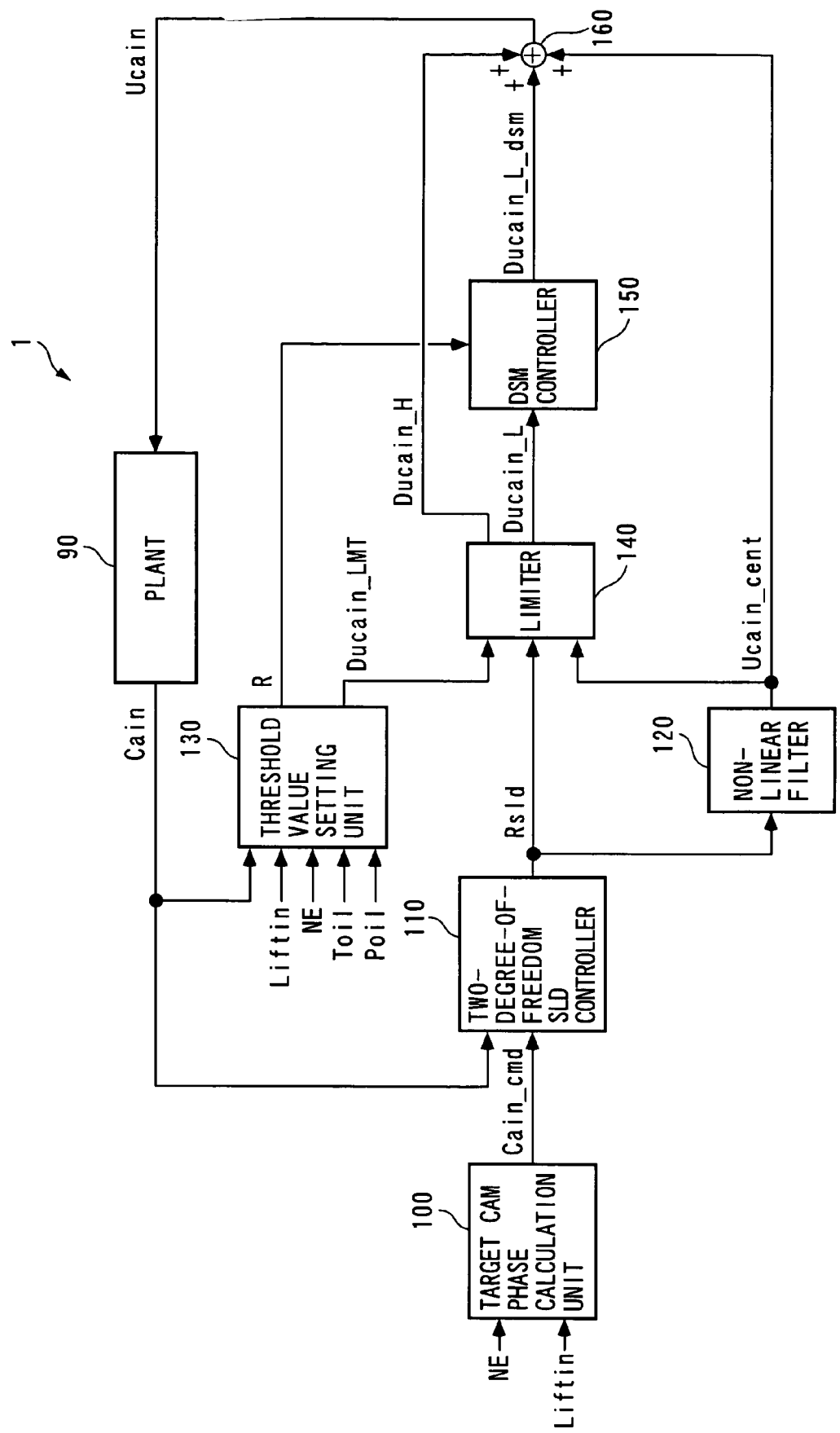
FIG. 10 is a block diagram generally illustrating the configuration of the control apparatus.

Next, a description will be given of the control apparatus 1 of this embodiment. As illustrated in FIG. 10, the control apparatus 1 is configured to control a plant 90, and comprises a target cam phase calculation unit 100, a two-degree-of-freedom sliding mode controller (hereinafter called the "two-degree-of-freedom SLD controller") 110, a non-linear filter 120, a threshold value setting unit 130, a limiter 140, a DSM controller 150, and an adder 160. Actually, either of these components is implemented by the ECU 2.

The plant 90 is defined to be a system which is applied with a control input Ucain, and outputs a cam phase Cain as a control amount, and specifically corresponds to a system including the cam phase varying mechanism 70.

First, the target cam phase calculation unit 100 calculates a target cam phase Cain_cmd through a map search, as later described, in accordance with the engine rotational speed NE and the valve lift Liftin. In this embodiment, the target cam phase calculation unit 100 corresponds to target value setting means and cam phase setting means, and the target cam phase Cain_cmd corresponds to a target value.

Next, a description will be given of the two-degree-of-freedom SLD controller 110. The two-degree-of-freedom SLD controller 110 calculates an SLD. control input Rsld in accordance with a target value filter type two-degree-of-freedom sliding mode control algorithm represented by Equations (1)–(8), later described, as a value for forcing the cam phase Cain to converge to the target cam phase Cain_cmd.

In this control algorithm, a filtered target cam phase value Cain_cmd_f is calculated in accordance with a first-order delay filter algorithm represented by the following Equation (1). In Equation (1), POLE_f is a target value filter setting parameter and is set to a value which satisfies a relationship represented by −1<POLE_f<0:

$$\text{Cain\_cmd\_}f(k) = -\text{POLE\_}f \cdot \text{Cain\_cmd\_}f(k-1) + (1 + \text{POLE\_}f) \cdot \text{Cain\_cmd}(k) \quad (1)$$

In Equation (1), each of discrete data followed by a suffix (k) indicates data sampled (or calculated) at a predetermined first period ΔT, later described, where the letter k represents the order of the sampling cycle of each discrete data. For example, k indicates a value sampled at the current sampling timing, and k−1 indicates a value sampled at the preceding sampling timing. This aspect is also applied to the following discrete data. Also, in the following description, the suffix (k) in each discrete data is omitted as appropriate.

Next, an SLD control input Rsld is calculated in accordance with a sliding mode control algorithm represented by the following equations (2)–(8):

$$Rsld(k) = Req(k) + Rrch(k) + Radp(k) + Rnl(k) \quad (2)$$

$$Req(k) = \frac{1}{b1}\{(1 - a1 - \text{POLE}) \cdot Cain(k) + (\text{POLE} - a2) \cdot Cain(k-1) - b2 \cdot Rsld(k-1) + \text{Cain\_cmd\_f}(k) + (\text{POLE} - 1) \cdot \text{Cain\_cmd\_f}(k-1) - \text{POLE} \cdot \text{Cain\_cmd\_f}(k-2)\} \quad (3)$$

$$Rrch(k) = \frac{-Krch}{b1} \cdot \sigma s(k) \quad (4)$$

$$Radp(k) = \frac{-Kadp}{b1} \cdot \sum_{i=0}^{k} \sigma s(i) \quad (5)$$

$$Rnl(k) = \frac{-Knl}{b1} \cdot sgn(\sigma s(k)) \quad (6)$$

$$\sigma s(k) = e(k) + \text{POLE} \cdot e(k-1) \quad (7)$$

$$e(k) = Cain(k) - \text{Cain\_cmd\_f}(k-1) \quad (8)$$

As shown in the above Equation (2), the SLD control input Rsld for the cam phase control is calculated as a sum total of an equivalent control input Req, an reaching law input Rrch, an adaptive law input Radp, and a non-linear input Rnl. The equivalent control input Req is calculated by Equation (3). In Equation (3), a1, a2, b1, b2 represent model parameters for a model, later described, and are set to predetermined values, respectively. Further, in Equation (3), POLE is a switching function setting parameter which is set to a value that satisfies a relationship represented by −1<POLE_f<POLE<0.

The reaching law input Rrch is calculated by Equation (4). In Equation (4), Krch represents a predetermined reaching law gain, and σs represents a switching function which is defined as in Equation (7). E in Equation (7) is a deviation which is defined as in Equation (8).

Further, the adaptive law input Radp is calculated by Equation (5). In Equation (5), Kadp represents a predetermined adaptive law gain. The non-linear input Rnl in turn is calculated by Equation (6). In Equation (6), Knl represents a predetermined non-linear gain, while sgn(σs) represents a sign function which takes 1 (sgn(σs)=1) when σs≧0, and −1 (sgn(σs)=−1) when σs<0 (sgn(σs)) may be set to zero (sgn(σs)=0) when σs=0).

The foregoing Equations (1)–(8) are derived in the following manner. First, the plant 90 is defined to be a system which receives the SLD control input Rsld instead of the control input Ucain as a control input, and delivers the cam phase Cain as a control amount, and is modelled as a discrete time system model, thus resulting in the following Equation (9). Based on the model represented by Equation (9), the target value filter type two-degree-of-freedom sliding mode control theory is applied such that the cam phase Cain converges to the target cam phase Cain_cmd, resulting in the derivation of the aforementioned Equations (1)–(8).

$$Cain(k+1) = a1 \cdot Cain(k) + a2 \cdot Cain(k-1) + b1 \cdot Rsld(k) + b2 \cdot Rsld(k+1) \quad (9)$$

According to the control algorithm of the two-degree-of-freedom SLD controller 110, the target value filter type algorithm sets a rate at which the cam phase Cain converges to the target cam phase Cain_cmd, while the sliding mode control algorithm sets the behavior of the cam phase Cain when it converges to the target cam phase Cain_cmd, thus making it possible to individually set the convergence rate and the convergence behavior as well as to ensure these convergence rate and convergence behavior at a high level. Specifically, the SLD control input Rsld can be calculated as a value which provides excellent characteristics, in view of control, that either of the convergence rate and the convergence behavior of the cam phase Cain to the target cam phase Cain_cmd can be ensured at a high level in a situation where the non-linear characteristics of the cam phase varying mechanism 70 does not affect the SLD control input Rsld. In this embodiment, the two-degree-of-freedom SLD controller 120 corresponds to control value calculating means, and the SLD control input Rsld corresponds to a control value.

Next, the non-linear filter 120 will be described. The non-linear filter 120 calculates a center value Ucain_cent for the amplitude of the control input Ucain, and is a combination of a median filter 121 and an ε filter 122, as illustrated in FIG. 11.

The median filter 121 samples a center value among 2f+1 (f is an integer) values of the SLD control input Rsld arranged in the order of magnitude as a filter value Rsld_flt, and its algorithm is represented as in the following Equation (10):

$$Rsld\_flt(k) = Fmed(Rsld(k), Rsld(k-1), \ldots, Rsld(k-2f)) \quad (10)$$

In the median filter 121, when 2f+1 is an even number, one of two values which sandwich the center, or an arithmetic average value of the two values may be sampled as the filter value Rsld_flt.

The ε filter 122 in turn applies filtering processing represented by the following Equations (11)–(14) to the filter value Rsld_flt sampled by the median filter 121 to calculate a center value Ucain_cent. In the following Equation (11), n is an integer, m is an integer which satisfies m≧2f+1, and ε is a predetermined positive value.

$$Ucain\_cent(k) = \frac{1}{n+1} \sum_{j=0}^{n} F\varepsilon(Rsld\_flt(k - mj), Rsld\_flt(k)) \quad (11)$$

when X>Y+ε:

$$F\varepsilon(X,Y) = Y \quad (12)$$

when Y−ε≦X≦Y+ε:

$$F\varepsilon(X,Y) = X \quad (13)$$

when X>Y−ε:

$$F\varepsilon(X,Y) = Y \quad (14)$$

As described above, the non-linear filter 120 calculates the center value Ucain_cent in accordance with the algorithm represented by Equations (10)–(14) which is a combination of the median filter 121 and the ε filter 122. In this way, when the SLD control input Rsld includes an impulse type noise component, the non-linear filter 120 can calculate the center value Ucain_cent while avoiding the influence of such a noise component. Also, when the SLD control input Rsld largely changes in steps, the center value Ucain_cent can be calculated as a value which presents a high responsibility to such a change in the SLD control input Rsld in accordance with the filtering characteristics of the ε filter 122.

It has been also confirmed in an experiment made by the present applicant that from synergy effects of both the filters 120, 121, even when the SLD control input Rsld includes a noise component of a relatively small amplitude, the influence of the noise component can be restrained in the calculation of the center value Ucain_cent. In the foregoing manner, the center value Ucain_cent, which is at the center of the amplitude of the control input Ucain, is calculated as such a value that accurately follows macroscopic changes in the SLD control input Tsld. In this embodiment, the non-linear filter 120 corresponds to control input calculating means and center value setting means.

Next, a description will be given of the aforementioned threshold value setting unit 130. The threshold calculating unit 130 calculates a threshold value Ducain_LMT and an amplitude setting value R in accordance with the valve lift Liftin, the cam phase Cain, the engine rotational speed NE, the oil pressure Poil, and the oil temperature Toil by a calculation approach shown in FIG. 14, later described. The threshold value Ducain_LMT is used to calculate a small deviation component value Ducain_L and a large deviation component value Ducain_H in the limiter 140, as will be later described. The amplitude setting value R is used to calculate a modulated value Ducain_L_dsm in the DSM controller 150, as will be later described.

On the other hand, the limiter 140 calculates the small deviation component value Ducain_L and a large deviation component value Ducain_H using the above-mentioned threshold value Ducain_LMT by the following Equations (15)–(20):

when Rsld(k)–Ucain_cent(k)>Ducain_LMT(k):

$$Ducain\_L(k)=Ducain\_LMT(k) \quad (15)$$

$$Ducain\_H(k)=Rsld(k)-Ucain\_cent(k)-Ducain\_LMT(k) \quad (16)$$

when –Ducain_LMT(k)≦Rsld(k)–Ucain_cent(k)≦Ducain_LMT(k):

$$Ducain\_L(k)=Rsld(k)-Ucain\_cent(k) \quad (17)$$

$$Ducain\_H(k)=0 \quad (18)$$

when Rsld(k)–Ucain_cent(k)<–Ducain_LMT(k):

$$Ducain\_L(k)=-Ducain\_LMT(k) \quad (19)$$

$$Ducain\_H(k)=Rsld(k)-Ucain\_cent(k)+Ducain\_LMT(k) \quad (20)$$

As shown in the above Equations (15), (17), (19), the small deviation component value Ducain_L is calculating by applying limit processing to a deviation of the SLD control input Rsld from the center value Ucain_cent to limit the deviation in a range defined by an upper limit Ducain_LMT and a lower limit –Ducain_LMT. In other words, the small deviation component value Ducain_L corresponds to a component when the SLD control input Rsld is fluctuating little in a range in which it does not exceed the absolute value of the threshold value Ducain_LMT with respect to the center value Ucain_cent.

Also, as shown in Equations (16), (18), (20), the large deviation component value Ducain_H is calculated to be zero when the absolute value of the deviation of the SLD control input Rsld from the center value Ucain_cent does not exceed the absolute value of the threshold value Ducain_LMT, and is calculated as a surplus value when the absolute value of the deviation exceeds the absolute value of the threshold value Ducain_LMT. In other words, the large deviation component value Ducain_H is calculated to be zero when the SLD control input Rsld fluctuates little, and is calculated as a value for appropriately reflecting the value of the SLD control input Rsld to the control input Ucain when the SLD control input Rsld largely fluctuates, i.e., when a rapid response of control is required. In this embodiment, the threshold value setting unit 130 corresponds to control input calculating means and amplitude setting means.

Also, the DSM controller 150 calculates a modulated value Ducain_L_dsm by modulating the small deviation component value Ducain_L in accordance with an algorithm to which applied is ΔΣ modulation algorithm represented by the following Equations (21)–(25):

$$r(k)=Ducain\_L(k) \quad (21)$$

$$\delta(k)=r(k)-u(k-1) \quad (22)$$

$$\sigma(k)=\sigma(k-1)+\delta(k) \quad (23)$$

$$u(k)=fnl(\sigma(k)) \quad (24)$$

$$Ducain\_L\_dsm(k)=u(k) \quad (25)$$

As shown in the above Equation (22), a deviation δ is calculated as a deviation of the small deviation component value Ducain_L from the preceding modulated value u. Also, in Equation (23), σ represents an integrated value of the deviation δ. In Equation (24), fnl (σ) is a non-linear function, the value of which is set to R (fnl (σ)=R) when σ≧0, and to –R (fnl (σ)=–R) when σ<0 (when σ=0, fnl(σ) may be set to zero (fnl(σ)=0)). As is apparent from the foregoing Equations (21)–(25), the modulated value Ducain_L_dsm is calculated as a value which repeats inversions between the minimum value –R and the maximum value R.

As described above, since the DSM controller 150 calculates the modulated value Ducain_L_dsm by modulating the small deviation component value Ducain_L in accordance with the foregoing algorithm, the DSM controller 150 can calculate the modulated value Ducain_L_dsm as a value which can compensate for the non-linear characteristics of the cam phase varying mechanism 70 while ensuring the aforementioned excellent characteristics of the SLD control input Rsld in view of control, i.e., the characteristics that either of the convergence rate and the convergence behavior of the camphase Cain to the target camphase Cain_cmd can be ensured at a high level when the SLD control input Rsld fluctuates little so that there is only a deviation equal to a small deviation component value Ducain_L from the center value Ucain_cent.

The adder 160 in turn calculates the control input Ucain by the following equation (26):

$$Ucain=Ducain\_L\_dsm+Ducain\_H+Ucain\_cent \quad (26)$$

In the foregoing manner, the control input Ucain is calculated as a sum total of the modulated value Ducain_L_dsm, the large deviation value Ducain_H, and the center value Ucain_cent. In this event, the center value Ucain_cent is calculated as a value which follows macroscopic changes in the SLD control input Rsld with a high accuracy, as described above, and the modulated value Ducain_L_dsm is calculated as a value which can compensate for the non-linear characteristics of the cam phase varying mechanism 70 while ensuring the characteristics that either of the convergence rate and convergence behavior of the cam phase Cain to the target camphase Cain_cmd can be ensured at a high level when the SLD control input Rsld fluctuates little, as described above. In addition to those, the large deviation component value Ducain_H is calculated as a value for ensuring a fast responsibility of control by appropriately reflecting the behavior of the SLD control input Rsld to the control input Ucain in a situation where a fast response is required for the control due to suddenly and largely changes in the target cam phase Cain_cmd to result in large fluctuations in the SLD control input Rsld.

Consequently, the control input Ucain, which is calculated as a sum total of these three values Ducain_L_dsm, Ducain_H, Ucain_cent, is calculated as a value which provides the aforementioned excellent characteristics of the SLD control input Rsld in view of control, i.e., the characteristics that either of the convergence rate and the convergence behavior of the cam phase Cain to the target cam phase Cain_cmd can be ensured at a high level, and can simultaneously compensate for the non-linear characteristics of the cam phase varying mechanism 70 due to the fact that the modulated value Ducain_L_dsm is modulated by the algorithm to which the ΔΣ modulation algorithm is applied, when the SLD control input Rsld fluctuates little. In addition to this, in a situation in which a fast response is required for the control in the event of large and sudden changes in the target cam phase Cain_cmd and the like, the control input Ucain is calculated as a value which can ensure the fast responsibility for the control by the action of the large deviation component value Ducain_H included in the control input Ucain. Alternatively, in accordance with a need for the control, the large deviation component value Ducain_H may be set to zero, so that the control input Ucain may be calculated as a sum total of the modulated value Ducain_L_dsm and the center value Ucain_cent.

Figure 12:
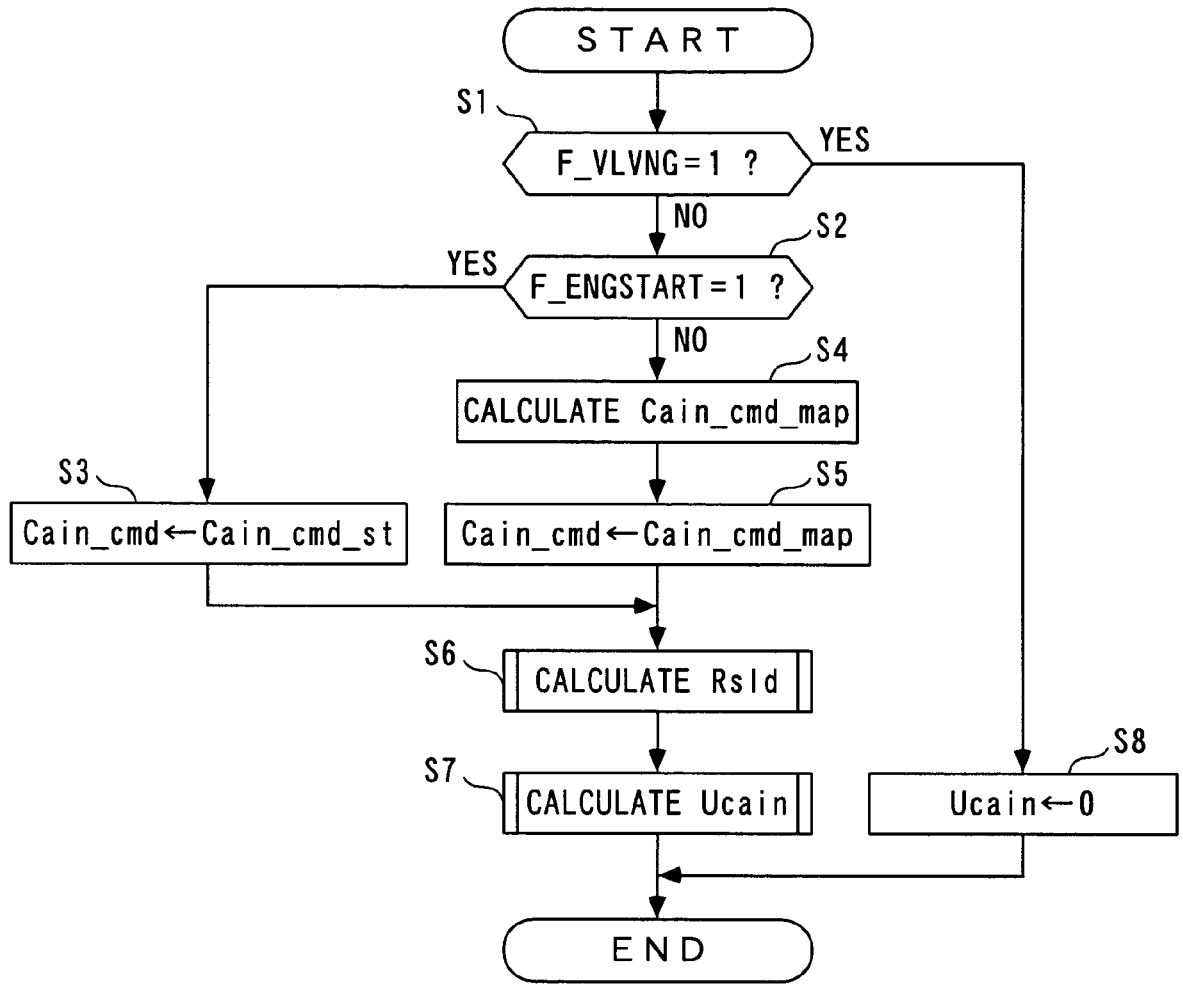
FIG. 12 is a flow chart illustrating a cam phase control routine.

In the following, a routine executed by the ECU 2 for controlling the cam phase Cain will be described with reference to FIG. 12. This routine is executed at a predetermined period ΔT (for example, every 5 msec). As illustrated in FIG. 12, the ECU 2 first determines at step 1 (abbreviated as "S1" in the figure. The same applies to subsequent figures) whether or not an intake valve actuating mechanism failure flag F_VLVNG is "1." The intake valve actuating mechanism failure flag F_VLVNG is set to "1" when the variable intake valve actuating mechanism 40 fails, and to "0" when it is normal.

If the result of the determination at step 1 is NO, indicating that the variable intake valve actuating mechanism 40 is normal, the routine proceeds to step 2, where the ECU 2 determines whether or not an engine start flag F_ENGSTART is "1." The engine start flag F_ENGSTART is set by determining whether or not the engine 3 is during an engine start control, i.e., during cranking in accordance with the output states of the engine rotational speed NE and the IG/SW switch 26 in a determination, not shown. Specifically, the flag F_ENGSTART is set to "1" during the engine start control, and otherwise to "0," respectively.

If the result of the determination at step 2 is YES, indicating that the engine is during the engine start control, the routine proceeds to step 3, where the target cam phase Cain_cmd is set to a predetermined start value Cain_cmd_st.

Figure 13:
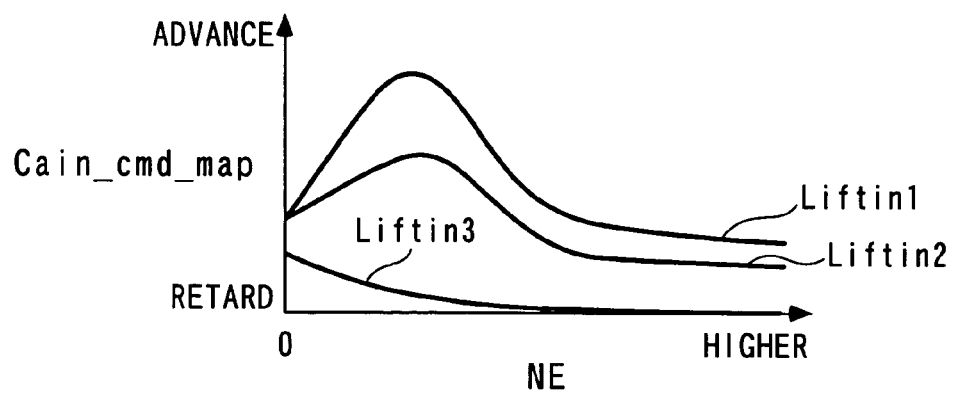
FIG. 13 is a diagram showing an example of a map for use in calculating a map value Cain_cmd_map for a target cam phase.

On the other hand, if the result of the determination at step 2 is NO, indicating that the engine 3 has been started, the routine proceeds to step 4, where the ECU 2 calculates a map value Cain_cmd_map for the target cam phase by searching a map shown in FIG. 13 in accordance with the engine rotational speed NE and the valve lift Liftin. In FIG. 13, predetermined values Liftin1–Liftin3 for the valve lift Liftin are set to such values that satisfy a relationship represented by Liftin1<Liftin2<Liftin3.

In the map of FIG. 13, the target cam phase Cain_cmd is set to a value deeper into the retard side as the engine rotational speed NE is higher when Liftin=Liftin3, i.e., when the engine is in a high-lift and high-load region. When Liftin=Liftin2, i.e., when the engine is moderately loaded, the target cam phase Cain_cmd is set to a value deeper into the advance side as the engine rotational speed NE is higher in a low rotational speed range, and to a value deeper into the retard side as the engine rotational speed NE is higher in a middle to a high rotational speed range. Further, when Liftin=Liftin1, i. e., when the engine is lowly loaded, the target cam phase Cain_cmd is set substantially in a similar tendency to the moderately loaded engine, but to a value deeper into the advance side than that.

Such settings are intended to increase the amount of intake air to increase the engine torque by controlling the valve lift Liftin to be high and controlling the cam phase Cain to a value deeper into the retard side in the high-load and high-rotation region. In addition to that, in such control, the settings are intended to control the cam phase Cain to a value deeper into the retard side due to a reduction in an internal EGR amount and a continued intake behavior caused by the inertia of the intake in an initial stage of a compression stroke, which is utilized to improve a filling efficiency.

In the low-load region or the low-rotational speed region, the valve lift Liftin is controlled to be low, and the cam phase Cain is controlled to be a value deeper into the advance angle than in the high-load region to accomplish the Miller cycle in which the intake valve 4 closes earlier than the Otto cycle. Consequently, a pumping loss is reduced, and an in-cylinder fluidity resulting from a lower lift is increased to speed up the combustion and improve the combustion efficiency.

Next, the routine proceeds to step 5, where the map value Cain_cmd_map calculated at step 4 is set to a target cam phase Cain_cmd.

At step 6 subsequent to step 3 or 5, the ECU 2 calculates the SLD control input Rsld in accordance with the control algorithm represented by the aforementioned Equations (1)–(8).

Next, the routine proceeds to step 7, where the ECU 2 calculates the control input Ucain, followed by termination of this routine. Specific contents of a routine for calculating the control input will be described later.

On the other hand, if the result of the determination at step 1 is YES, indicating that the variable intake valve actuating mechanism 40 fails, the routine proceeds to step 8, where the ECU 2 sets the control input Ucain to zero, followed by termination of this routine. In this way, the cam phase Cain is controlled to be the maximum retard value Cainrt.

Figure 14:
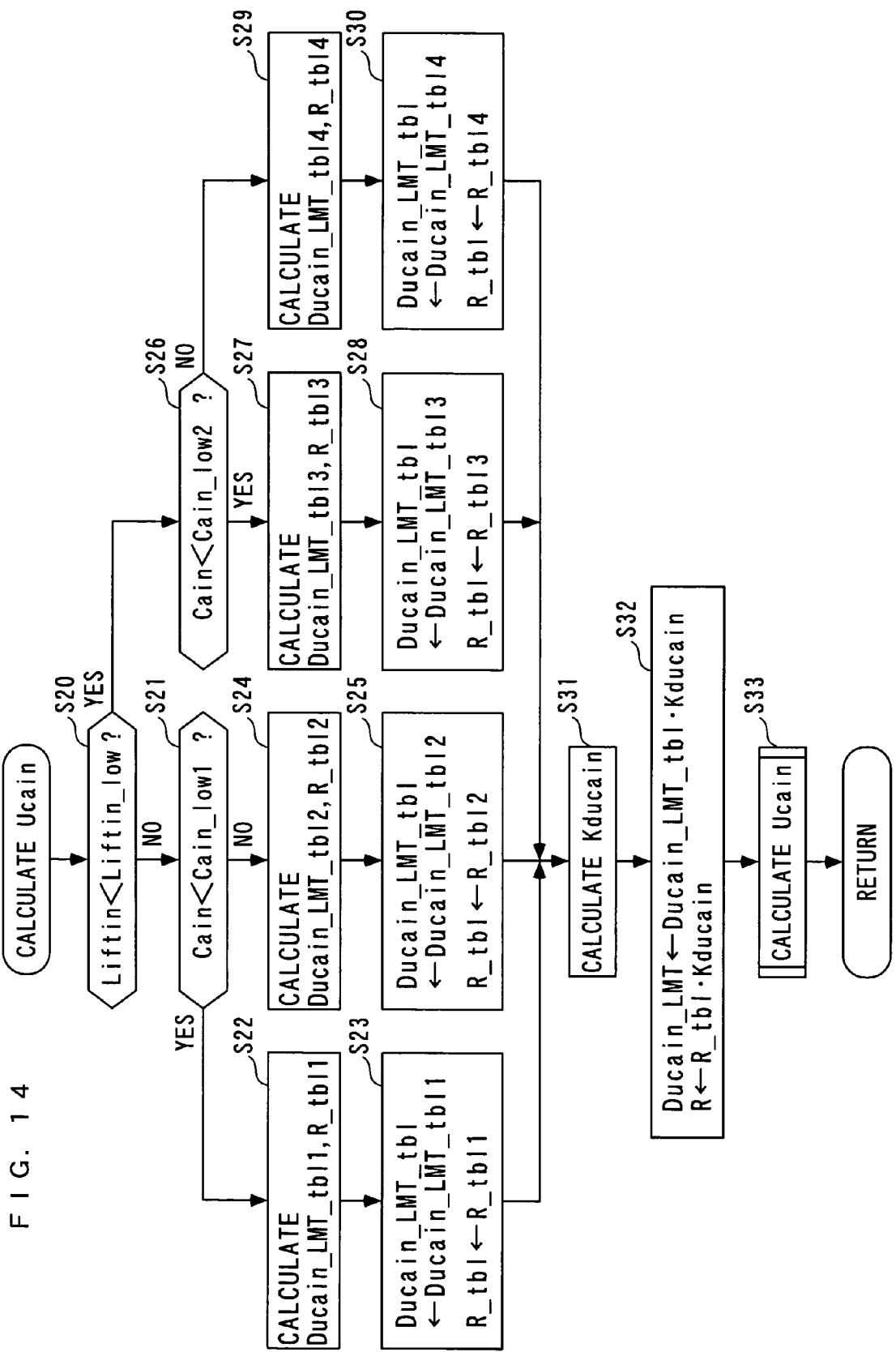
FIG. 14 is a flow cart illustrating a routine for calculating a control input Ucain.

Referring next to FIG. 14, a description will be given of a routine for calculating the control input Ucain. In this routine, the ECU first determines at step 20 whether or not the valve lift Liftin is smaller than a predetermined value Liftin_low (for example, ⅖ of the maximum value Liftnmax).

If the result of the determination at step 20 is NO, indicating that the valve lift Liftin is in a high lift state, the routine proceeds to step 21, where the ECU 2 determines whether or not the cam phase Cain is smaller than a first predetermined value Cain_low1 (for example, ⅙ of the maximum advance value Cainad). In other words, the ECU 2 determines whether or not the camphase Cain presents a value deeper into the retard side than the first predetermined value Cain_low1.

Figure 15:
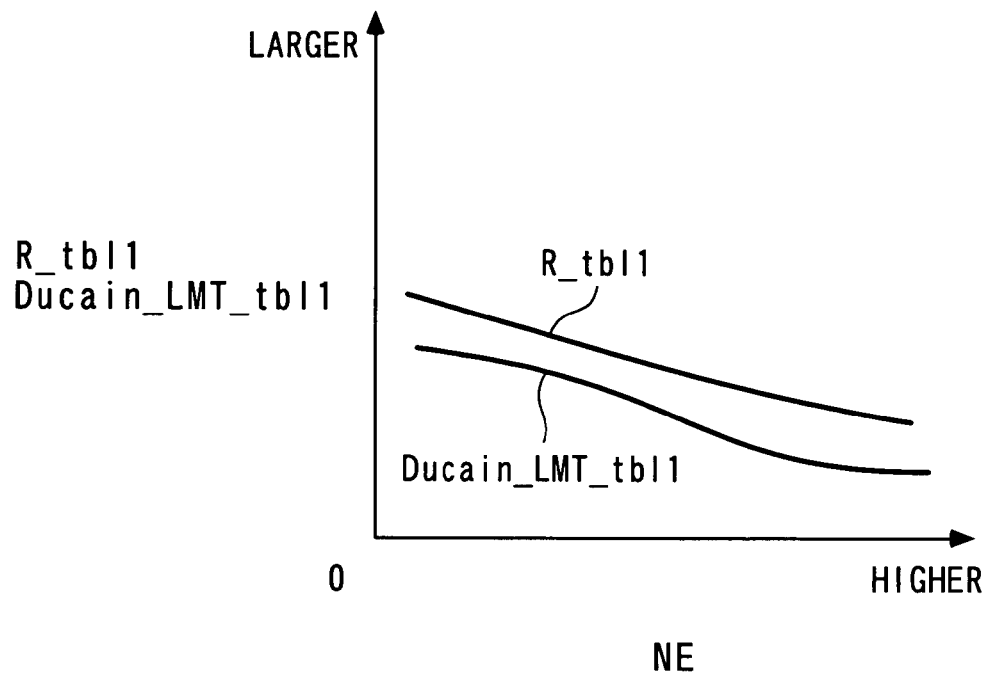
FIG. 15 is a diagram showing an example of a table for use in calculating high-lift and retard range values R_tbl1, Ducain_LMT_tbl1 for an amplitude setting value R and a threshold value Ducain_LMT.

If the result of the determination at step 21 is YES, i.e., when the cam phase Cain presents a value deeper into the retard side than the first predetermined value Cain_low1, the routine proceeds to step 22, where the ECU 2 searches a table shown in FIG. 15 in accordance with the engine rotational speed NE to calculate values R_tbl1, Ducain_LMT_tbl1 for the high-lift and retard region of the amplitude setting value R and the threshold value Ducain_LMT.

As shown in FIG. 15, the values R_tbl1, Ducain_LMT_tbl1 for the high-lift and retard region are set to larger values as the engine rotational speed NE is lower. Stated conversely, they are set to smaller values as the engine rotational speed NE is higher. This setting is made for the following reason. When the engine rotational speed NE is lower, the CAN signal and CRK signal are generated at longer intervals, resulting in a lower detection accuracy for the cam phase Cain. In other words, the non-linear characteristics vary. Therefore, by setting the amplitude of the modulated value Ducain L_dsm, i.e., the amplitude of the control input Ucain to a larger value, a lower detection accuracy for the cam phase Cain, i.e., variations in the non-linear characteristics are compensated for to improve the control accuracy. Also, the hydraulically driven cam phase varying mechanism 70 is affected by a cam counter-force when the cam phase Cain is changed, and characteristically receives the cam counter-force at a shorter period as the engine rotational speed is higher, resulting in a higher sensitivity of the cam phase Cain to the control input Ucain due to an increase in energy per unit time. Therefore, as the engine rotational speed NE is higher, i.e., as the cam phase Cain has a higher sensitivity, the amplitude of the modulated value Ducain_L_dsm, i.e., the amplitude of the control input Ucain is set to a smaller value.

Also, the values R_tbl1, Ducain_LMT_tbl1 for the high-lift and retard range are set to satisfy R_tbl1>Ducain_LMT_tbl1. This is intended to ensure the excellent characteristic exhibited by the aforementioned SLD control input Rsld in regard to control in the modulated value Ducain_L_dsm, i.e., the control input Ucain. In other words, this is intended to ensure the characteristic that either of the convergence speed and convergence behavior of the cam phase Cain to the target cam phase Cain_cmd can be ensured at a high level in the control input Ucain. It should be noted that these two values may be set to satisfy R_tbl1=Ducain_LMT_tbl1, and may be set to satisfy R_tbl1 ≧Ducain_LMT_tbl1 as required.

Next, the routine proceeds to step 23, where the table values R_tbl, Ducain_LMT_tbl for the amplitude setting value R and the threshold value Ducain_LMT are set to the values R_tbl1, Ducain_LMT_btl1 for the high-lift and retard range calculated at step 22, respectively.

Figure 16:
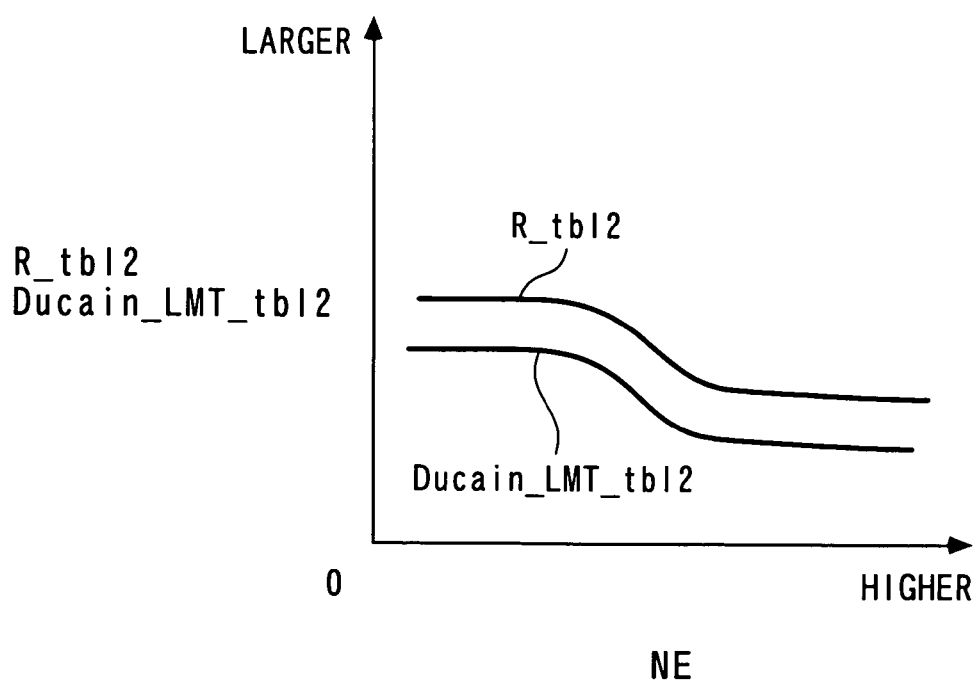
FIG. 16 is a diagram showing an example of a table for use in calculating high-lift and non-retard range values R_tbl2, Ducain_LMT_tbl2 for the amplitude setting value R and the threshold value $Ducain_{LMT}$.

On the other hand, if the result of the determination at step 21 is NO, indicating that the cam phase Cain has a value equal to the first predetermined value Cain_low1, or a value deeper into the advance side than the first predetermined value, the routine proceeds to step 24, where the ECU 2 calculates values R_tbl2, Ducain_LMT_tbl2 for a high-lift and non-retard range of the amplitude setting value R and the threshold Ducain_LMT, respectively, by searching a table shown in FIG. 16 in accordance with the engine rotational speed NE.

As shown in FIG. 16, either of the values R_tbl2, Ducain_LMT_tbl2 for the high-lift and non-retard range is set to a larger value as the engine rotational speed NE is lower for the same reason as that discussed in the description of the aforementioned FIG. 15.

Also, as is apparent from a comparison of FIG. 16 with FIG. 15, the values R_tbl1, Ducain_LMT_tbl1 for the high-lift and retard range are set to smaller values than the values R_tbl2, Ducain_LMT_tbl2 for the high-lift and non-retard range (R_tbl2>R_tbl1, Ducain_LMT_tbl2>Ducain_LMT_tbl1). With the valve lift Liftin remaining in a high lift state, if the cam phase Cain is controlled to be retarded, the crank angular speed more largely fluctuates due to a higher filling efficiency and a resulting increase in torque. Accordingly, the foregoing setting is made to set the amplitude of the modulated value Ducain_L_dsm, i.e., the amplitude of the control input Ucain to a smaller value.

Further, the values R_tbl2, Ducain_LMT_tbl2 for the high-lift and non-retard range are set to satisfy R_tbl2>Ducain_LMT_tbl2. This setting is made for the reason set forth above.

Next, the routine proceeds to step 25, where the table values R_tbl, Ducain_LMT_tbl for the amplitude setting value R and the threshold value Ducain_LMT are set to the values R_tbl2, Ducain_LMT_tbl2 for the high-lift and non-retard range calculated at step 24, respectively.

On the other hand, if the result of the determination at step 20 is YES, indicating that the valve lift is set to a low lift, the routine proceeds to step 26, where the ECU 2 determines whether or not the cam phase Cain is smaller than a second predetermined value Cain_low2 (for example, a value half as much as the maximum advance value Cainad). In other words, the ECU 2 determines whether or not the cam phase Cain has a value deeper into the retard side than the second predetermined value Cain_low2.

Figure 17:
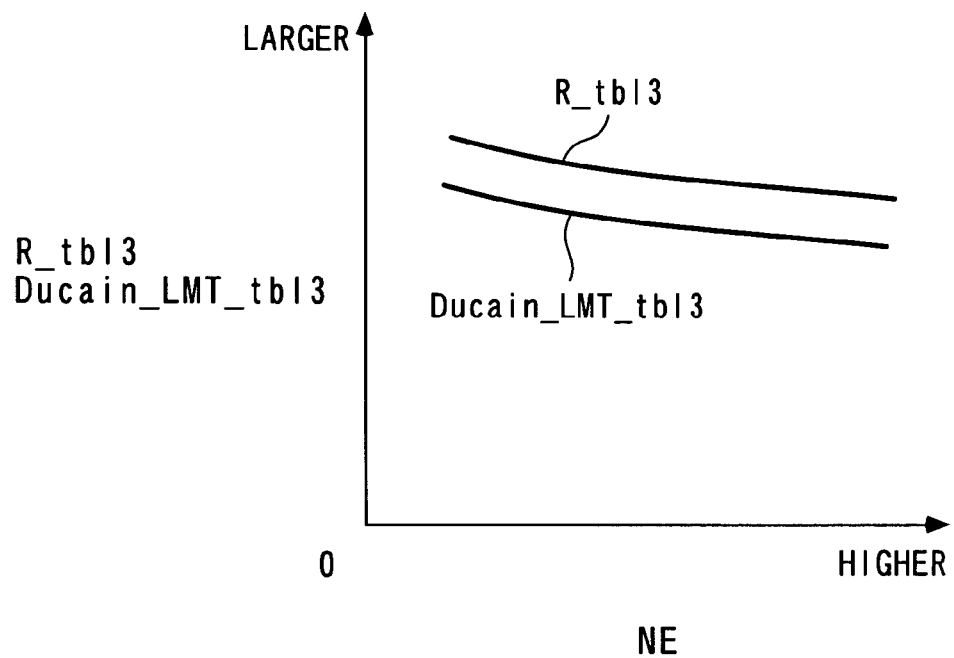
FIG. 17 is a diagram showing an example of a table for use in calculating low-lift and retard range values R_tbl3, Ducain_LMT_tbl3 for the amplitude setting value R and the threshold value Ducain_LMT.

If the result of the determination at step 26 is YES, indicating that the cam phase Cain has a value deeper into the retard side than the second predetermined value Cain_low2, the routine proceeds to step 27, where the ECU 2 calculates values R_tbl3, Ducain_LMT_tbl3 for a low-lift and retard range of the amplitude setting value R and the threshold value Ducain_LMT by searching a table shown in FIG. 17 in accordance with the engine rotational speed NE.

As shown in FIG. 17, either of the values R_tbl3, DUcain_ LMT_tbl3 for the low-lift and retard range is set to a larger value as the engine rotational speed NE is lower for the reason set forth above. Also, the values R_tbl3, Ducain_LMT_tbl3 for the low-lift and retard range are set to satisfy R_tbl3>Ducain_LMT_tbl3 for the reason set forth above.

Further, as is apparent from a comparison of FIG. 17 with the aforementioned FIGS. 15 and 16, the values R_tbl3, Ducain_LMT_tbl3 for the low-lift and retard range are set to such values that satisfy R_tbl3>R_tbl2>R_tbl1, and Ducain_LMT_tbl3>Ducain_LMT_tbl2>Ducain_LMT_tbl1. As described above, when the valve lift Liftin is in a low lift range, the cam phase Cain is controlled to be further advanced due to the target cam phase Cain_cmd being set to a value deeper into the advance side than when the valve lift Liftin is in a high lift range (see FIG. 13). Accordingly, the amplitude of the modulated value Ducain_L_dsm, i.e., the amplitude of the control input Ucain is set to a larger value.

Next, the routine proceeds to step 28, where the table values R_tbl, Ducain_LMT_tbl for the amplitude setting value R and the threshold value Ducain_LMT are set to the values R_tbl3, Ducain_LMT_tbl3 for the low-lift and retard range calculated at step 27, respectively.

Figure 18:
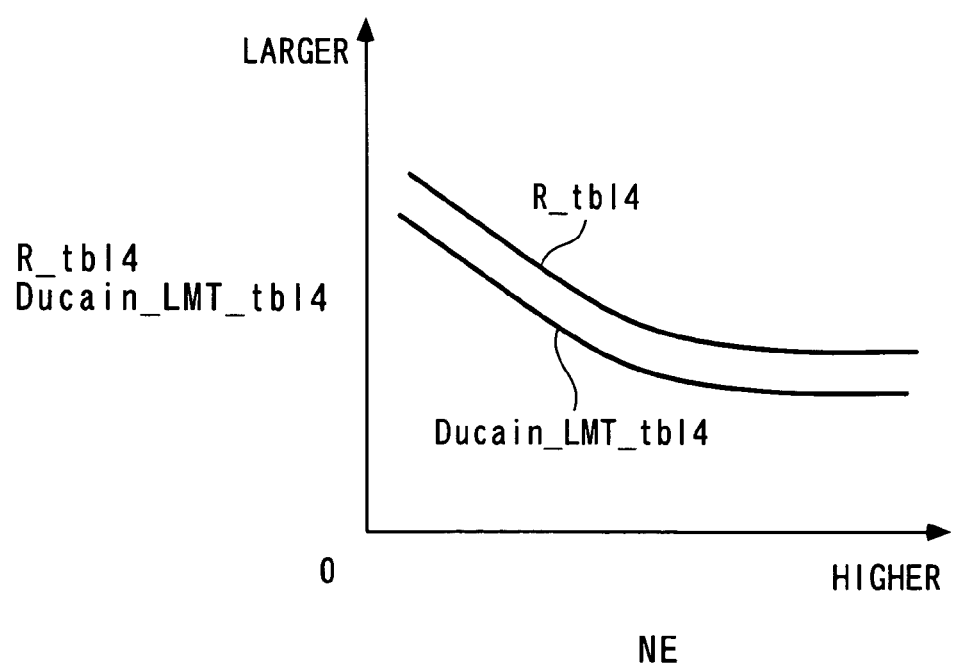
FIG. 18 is a diagram showing an example of a table for use in calculating low-lift and advance range values R_tbl4, Ducain_LMT_tbl4 for the amplitude setting value R and the threshold value Ducain_LMT.

On the other hand, if the result of the determination at step 26 is NO, indicating that the cam phase Cain has a value equal to the second predetermined value Cain_low2, or a value deeper into the advance side than the second predetermined value Cain_low2, the routine proceeds to step 29, where the ECU 2 calculates values R_tbl4, Ducain_LMT_tbl4 for a low-lift and advance range of the amplitude setting value R and the threshold value Ducain_LMT by searching a table shown in FIG. 18 in accordance with the engine rotational speed NE.

As shown in FIG. 18, either of the values R_tbl4, Ducain_LMT_tbl4 for the low-lift and advance range is set to a larger value as the engine rotational speed NE is lower for the reason set forth above.

Also, as is apparent from a comparison of FIG. 18 with FIG. 17, the values R_tbl4, Ducain_LMT_tbl4 for the low-lift and advance range are set to smaller values than the values R_tbl3, Ducain_LMT_tb3 for the low-lift and retard range (R_tbl4<R_tbl3, Ducain_LMT_tbl4<Ducain_LMT_tbl3). This setting is made for the reason set forth below. When the cam phase Cain is in an advance range, the internal EGR amount increases more than when in a retard range to cause larger fluctuations in the crank angular speed, resulting in a higher sensitivity of the camphase Cain to the control input Ucain. Accordingly, the amplitude of the modulated value Ducain_L_dsm, i.e., the amplitude of the control input Ucain is set to a smaller value.

Further, the values R_tbl4, Ducain_LMT_tb4 for the low-lift and advance range are set to satisfy R_tbl4>Ducain_LMT_tbl4 for the reason set forth above.

Figure 19:
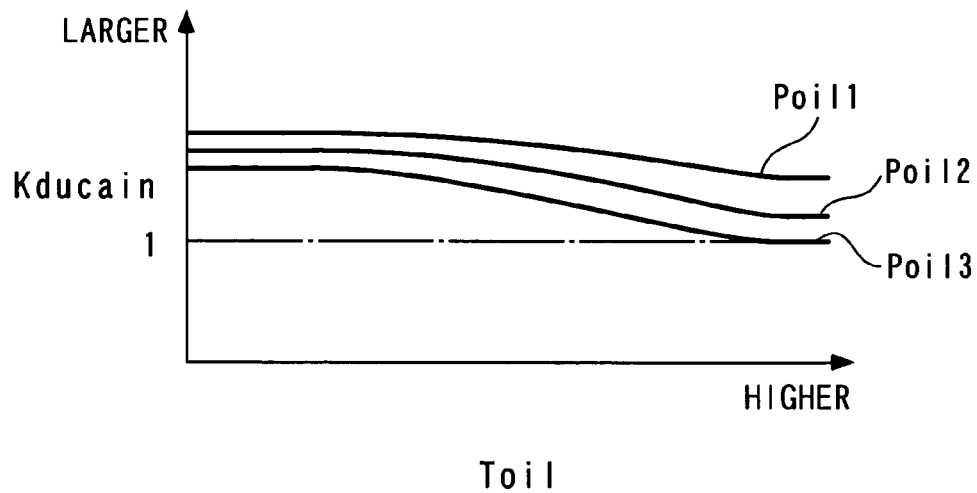
FIG. 19 is a diagram showing an example of a map for use in calculating a correction coefficient Kducain.

At step 31 subsequent to the foregoing step 23, 25, 28 or 30, the ECU 2 calculates a correction coefficient Kducain by searching a map shown in FIG. 19 in accordance with the oil temperature Toil and the oil pressure Poil. In FIG. 19, predetermined values Poil1–Poil3 for the oil pressure are set to such values that satisfy a relationship represented by Poil1<Poil2<Poil3.

In this map, the correction coefficient Kducain is set to a value equal to or larger than one, and is set to a larger value as the oil temperature Toil is lower or as the oil pressure Poil is lower. Since the lower oil temperature Toil supplied to the cam phase varying mechanism 70 causes a larger viscous resistance, the cam phase Cain responds to the control input Ucain with a larger delay (i.e., with stronger non-linear characteristics). Accordingly, the amplitude of the control input Ucain is set to a larger value to compensate for the delay in response. Also, since the cam phase Cain also responds to the control input Ucain with a larger delay when the oil pressure is lower (i.e., with stronger non-linear characteristics), the amplitude of the control input Ucain is set to a larger value to compensate for the delay in response.

Next, at step 32, the ECU 2 sets the threshold value Ducain_LMT to the product of the table value Ducain_LMT_tbl and the correction coefficient Kducain, and sets the amplitude setting value R to the product of the table value R_tbl and the correction coefficient Kducain.

Next, the routine proceeds to step 33, where the ECU 2 calculates the control input Ucain in accordance with the aforementioned algorithm represented by Equations (10)–(26), followed by termination of this routine.

Figure 20:
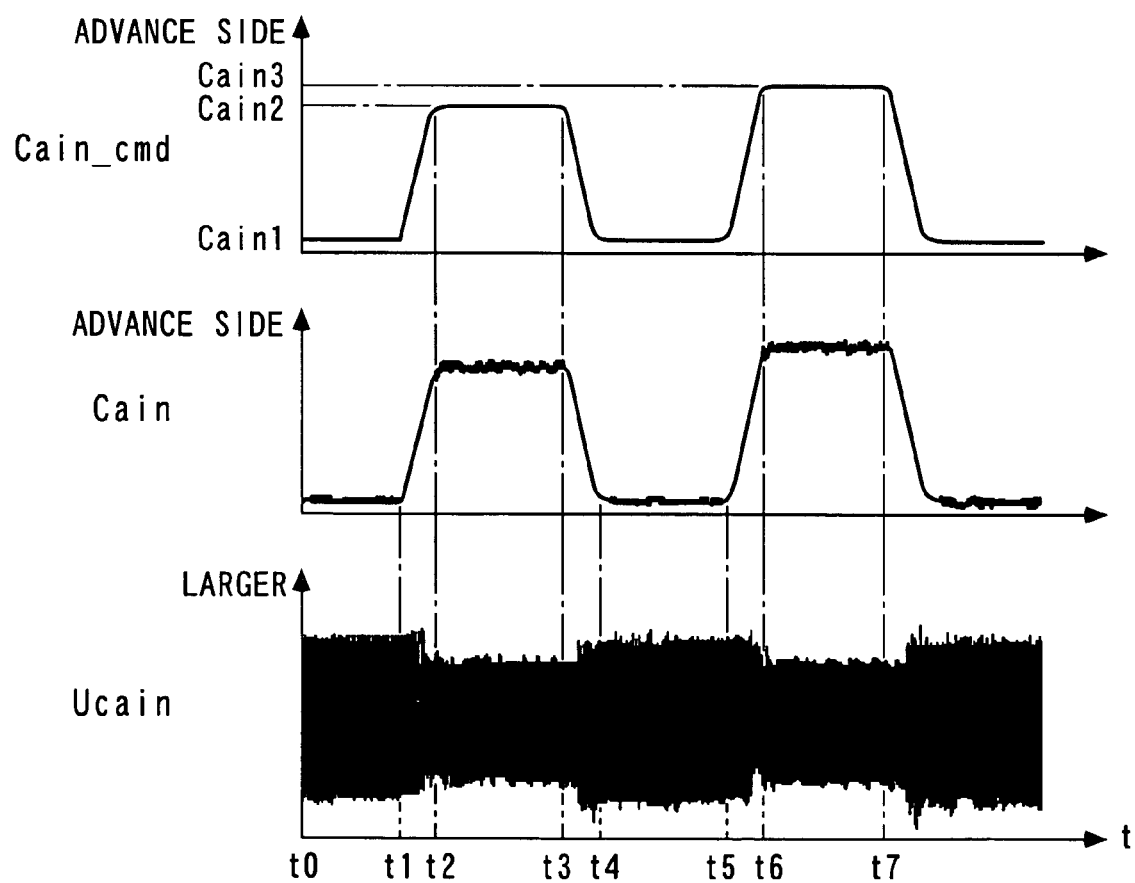
FIG. 20 is a timing chart illustrating an example of a result of controlling the cam phase.
Figure 21:
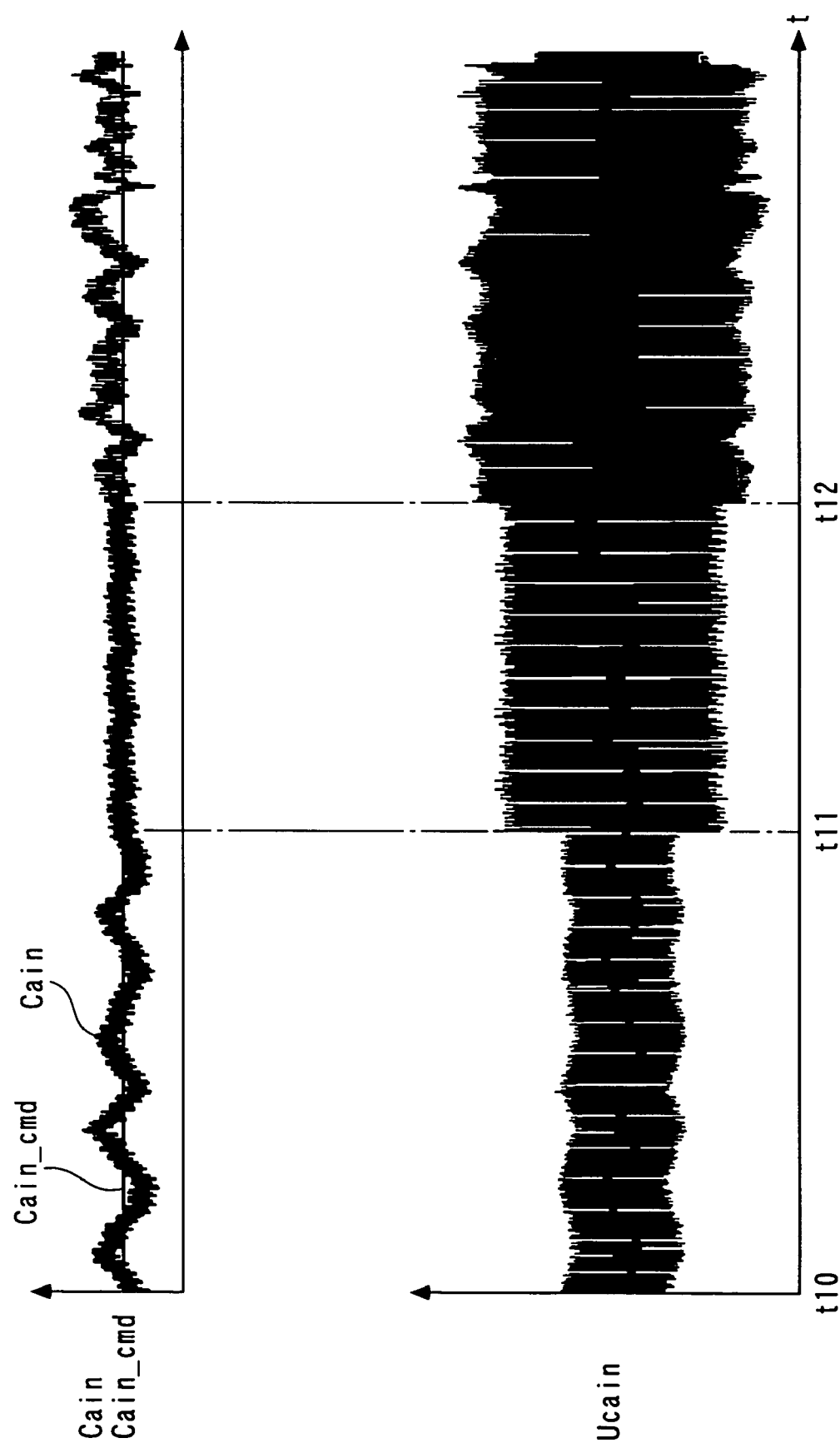
FIG. 21 is a timing chart illustrating an exemplary control result when the control input Ucain is intentionally changed.

Referring next to FIGS. 20 and 21, a description will be given of the result of the controlling the cam phase Cain by the control apparatus 1 of this embodiment. First, FIG. 20 shows the result of the control when the valve lift Liftin is kept at a predetermined low lift, and the target cam phase Cain_cmd is varied substantially in a rectangular waveform between a predetermined value Cain1 close to the maximum retard value Cainrt and predetermined values Cain2 and Cain3 (Cain1<Cain2<Cain3) on the advance side.

As is apparent from FIG. 20, the control input Ucain is set to a smaller amplitude value when the cam phase Cain is controlled to be the predetermined value Cain1 (t0 to t1, t4 to t5) than when the cam phase Cain is controlled to be the predetermined value Cain 2 or Cain 3 (t2 to t3, t6 to t7). As described above, when the valve lift Liftin is a low lift and the cam phase Cain is in an advance range, the internal EGR amount increases more than when the cam phase Cain is in a retard range, resulting in larger fluctuations in the crank angular speed and a consequence increase in the sensitivity of the cam phase Cain to the control input Ucain. Accordingly, the amplitude of the control input Ucain is set to a smaller value.

FIG. 21 in turn shows the result of the control when the valve lift Liftin and the target cam phase Cain_cmd are kept at predetermined constant values, respectively, and the control input Ucain is varied in amplitude. In FIG. 21, the result of the control between times t11 and t12 is obtained in accordance with the control algorithm of this embodiment; the result of the control between times t10 and t11 is obtained when the amplitude of the control input Ucain is intentionally set smaller than a value calculated in accordance with the control algorithm of this embodiment; and the result of the control at time t12 onward is obtained when the amplitude of the control input Ucain is intentionally set larger than the value calculated in accordance with the control algorithm of this embodiment. As is apparent from FIG. 21, it is understood that either of the control resolution and the control accuracy can be ensured at a high level only when the amplitude of the control input Ucain is set to an appropriate value in conformity to the sensitivity of the cam phase Cain to the control input Ucain and the non-linear characteristics in the cam phase varying mechanism 70, whereas either of the control resolution and the control accuracy is degraded when the amplitude of the control input Ucain is set smaller or larger than such an appropriate value.

According to the control apparatus 1 of this embodiment as described above, the SLD control input Rsld is calculated in accordance with the target value filter type two-degree-of-freedom sliding mode control algorithm, and the control input Ucain to the camphase varying mechanism 70 is calculated using this SLD control input Rsld in accordance with the modulation algorithm to which the $\Delta\Sigma$ modulation algorithm is applied. In this event, The SLD control input Rsld is calculated in accordance with the target value filter type two-degree-of-freedom sliding mode control algorithm, so that the SLD control input Rsld is calculated as a value which provides the characteristic that can ensure both the convergence speed and the convergence behavior of the cam phase Cain to the target cam phase Cain_cmd at a high level in a situation where the SLD control input Rsld is not affected by the non-linear characteristics of the cam phase varying mechanism 70.

The control input Ucain in turn is calculated as the sum total of the modulated value Ducain_L_dsm, the large deviation component value Ducain_H, and the center value Ucain_cent. As described above, the center value Ucain_cent is calculated as a value which follows macroscopic variations in the SLD control input Rsld with a high accuracy, attributable to the filtering characteristics of the non-linear filter 120. Also, as described above, the modulated value Ducain_L_dsm is calculated as a value which can compensate for the non-linear characteristics of the cam phase varying mechanism 70 while ensuring the characteristic that either of the convergence speed and the convergence behavior of the cam phase Cain to the target cam phase Cain_cmd can be ensured at a high level when the SLD control input Rsld fluctuates little. In addition to the foregoing, the large deviation component value Ducain_H is calculated as a value which can ensure a fast control response in a situation where it is required, and as the value of zero in other situations.

Thus, by using the control input Ucain which is calculated as the sum total of these three values Ducain_L_dsm, Ducain_H, Ucain_cent, when the SLD control input Rsld fluctuates little in the camphase control, either of the convergence speed and the convergence behavior of the cam phase Cain to the target cam phase Cain_cmd can be ensured at a high level while compensating for the non-linear characteristics of the cam phase varying mechanism 70. As a result, it is possible to ensure the control resolution at a high level to ensure a high control accuracy in the cam phase control. In addition to this, in a situation where the SLD control input Rsld largely fluctuates so that a fast control response is required, such a fast control response can be ensured by the large deviation component value Ducain_H included in the control input Ucain.

Further, the threshold value Ducain_LMT and the amplitude setting value R are calculated in accordance with the valve lift Liftin, the cam phase Cain, the engine rotational speed NE, the oil pressure Poil, and the oil temperature Toil, and the modulated value Ducain_L_dsm, i.e., the control input Ucain is calculated using the thus calculated threshold value Ducain_LMT and amplitude setting value R, thus making it possible to appropriately compensate for a change in the non-linear characteristics of the cam phase varying mechanism 70 and a change in the sensitivity of the cam phase Cain to the control input Ucain, associated with changes in these parameters, by the action of the control input Ucain. This can result in a higher control resolution and an improved control accuracy.

In addition to the above, since the center value Ucain_cent is calculated as a value which accurately follows macroscopic variations in the SLD control input Rsld, the amplitude of the control input Ucain can be set to a smaller value as compared with the prior art in which the center value of the amplitude of a modulated control input remains unchanged. As a result, it is possible to ensure the control resolution at a high level and ensure a high control accuracy even when the SLD control input Rsld largely fluctuates in amplitude.

Further, since the modulated value Ducain_L_dsm is calculated in accordance with the algorithm to which the $\Delta\Sigma$ modulation algorithm is applied, the control input Ucain inverts at a higher frequency, due to the characteristics of the $\Delta\Sigma$ modulation algorithm, as the small deviation component value Ducain_L approaches more to zero, i.e., as the SLD control input Rsld less fluctuates in a situation where the cam phase Cain is close to the target cam phase Cain_cmd. As a result, as compared with the use of the control input Ucain which is modulated by PWM or dither at a constant inversion frequency, the cam phase Cain can more readily converge to the target cam phase Cain_cmd.

While the non-linear filter 120 in the first embodiment is a combination of the median filter 121 and the $\epsilon$ filter 122, the non-liner filter may employ a moving average filter instead of the median filter 121, i.e., a combination of the moving average filter and the $\epsilon$ filter 122. In this combination, the algorithm of the moving average filter is represented by the following Equation (27):

$$\text{Rsld\_flt}(k) = \frac{1}{ma+1} \sum_{i=0}^{ma} Rsld(i) \qquad (27)$$

where ma is an integer and is set to satisfy m≧ma+1.

With the use of the non-linear filter which is a combination of the moving average filter and the $\epsilon$ filter 122, it is also possible to provide advantageous effects similar to those of the aforementioned non-linear filter 120. Specifically, the center value Ucain_cent can be calculated while avoiding the influence of impulse-like noise in the SLD control input Rsld, and even when the SLD control unit Rsld largely changes in steps, the center value Ucain_cent can be calculated as a value which exhibits high follow-up capabilities to such a change in the SLD control input Rsld. Also, even when the SLD control input Rsld includes noise having a relatively small amplitude, the influence of the noise can be restrained in the calculation of the center value Ucain_cent.

Also, the first embodiment represents an example in which table values for the amplitude setting value R and the threshold value Ducain_LMT are calculated through a table search, and the table used in the calculation is switched in accordance with the valve lift Liftin and the cam phase Cain. However, the approach of calculating the amplitude setting value R and the threshold value Ducain_LMT is not so limited, but any approach may be employed as long as the approach calculates these values in accordance with the valve lift Liftin, the cam phase Cain, and the engine rotational speed NE. For example, a plurality of maps which set map values for the amplitude setting value R and the threshold value Ducain_LMT in accordance with the cam phase Cain and the engine rotational speed NE may be switched in accordance with the valve lift Liftin.

Further, while the first embodiment represents an example in which the control apparatus of the present invention is applied to control the hydraulically driven cam phase varying mechanism 70 as a plant, the control apparatus of the present invention is not so limited, but can be applied to those which control a variety of industrial devices which exhibit non-linear characteristics. For example, the control apparatus of the present invention may be applied to one which controls the cam phase Cain through an electromagnetically driven cam phase varying mechanism, or one which controls the valve lift Liftin through the valve lift varying mechanism 50.

Also, while the first embodiment represents an example in which the control apparatus 1 is applied to control the cam phase varying mechanism 70 for varying the cam phase Cain of the intake valve 4, the control apparatus of the present invention is not so limited, but can also be applied to a mechanism for varying the phase of the exhaust cam 6 relative to the crank shaft 3d.

Figure 22:
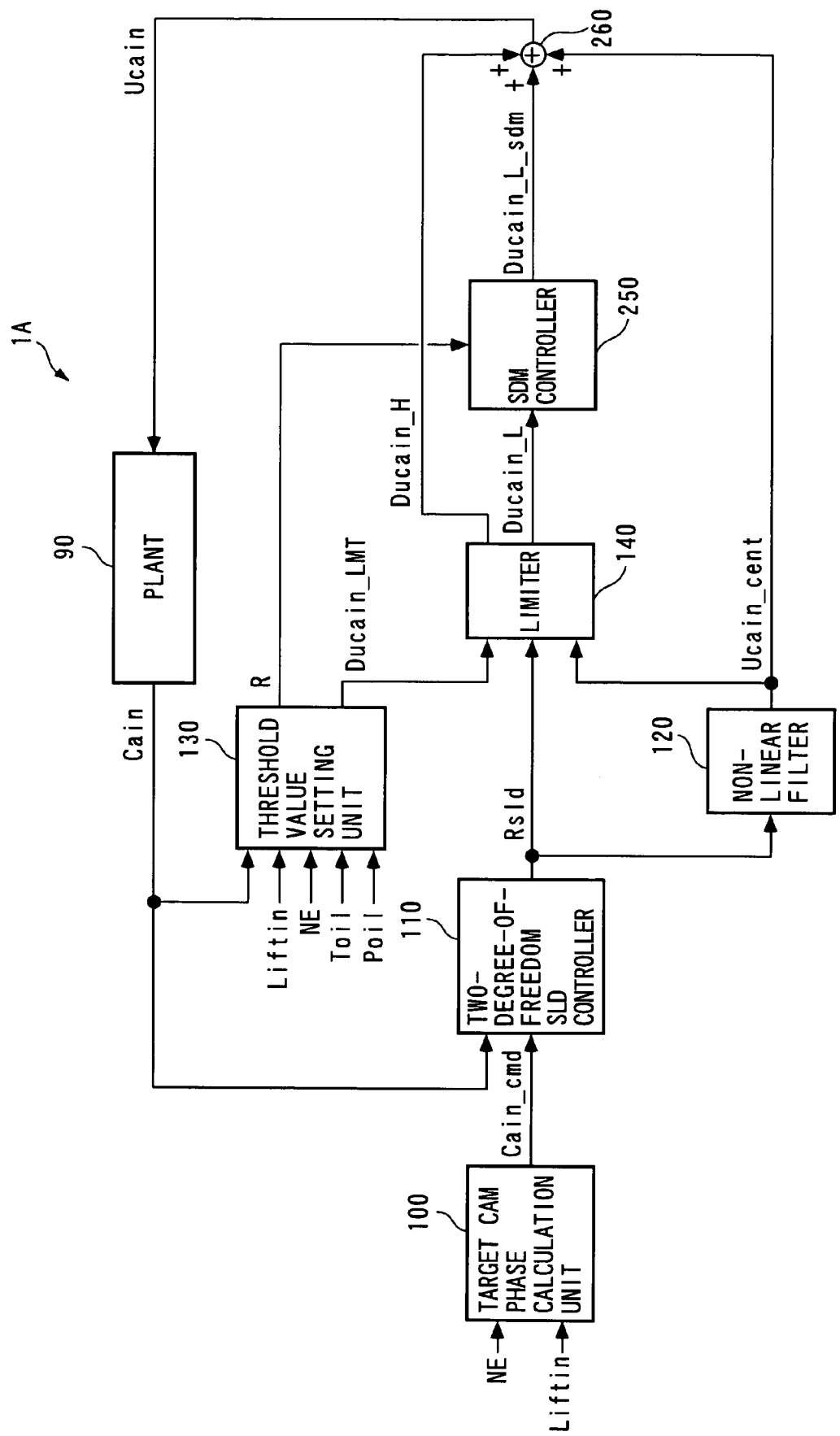
FIG. 22 is a block diagram generally illustrating the configuration of a control apparatus according to a second embodiment.

Next, a control apparatus 1A according to a second embodiment of the present invention will be described with reference to FIG. 22. In the following description, components identical to those in the first embodiment are designated the same reference numerals, and a description thereon is omitted. As illustrated in FIG. 22, the control apparatus 1A also controls the cam phase Cain, but differs from the control apparatus 1 of the first embodiment described above in that a SDM controller 250 is provided instead of the DSM controller 150 in the control apparatus 1, and accordingly, an adder 260 calculates the control input Ucain in accordance with an algorithm different from that of the adder 160. As such, the following description will be centered only on these different components.

The SDM controller 250 calculates a modulated value Ducain_L_sdm by a modulation in accordance with an algorithm to which the $\Sigma\Delta$ modulation algorithm is applied as shown in the following Equations (28)–(33):

$$r(k)=\text{Ducain\_L}(k) \quad (28)$$

$$\sigma r(k)=\sigma r(k-1)+r(k) \quad (29)$$

$$\sigma u(k)=\sigma u(k-1)+u(k-1) \quad (30)$$

$$\delta(k)=\sigma r(k)-\sigma u(k) \quad (31)$$

$$u(k)=\text{fnl}(\delta(k)) \quad (32)$$

$$\text{Ducain\_L\_sdm}(k)=u(k) \quad (33)$$

The adder 260 in turn calculates the control input Ucain by the following Equation (34):

$$\text{Ucain}=\text{Ducain\_L\_sdm}+\text{Ducain\_H}+\text{Ucain\_cent} \quad (34)$$

According to the control apparatus 1A of the second embodiment, since the SDM controller 250 calculates the modulated value Ducain_L_sdm which is then used to calculate the control input Ucain, the control apparatus 1A can provide similar advantageous effects to those of the aforementioned control apparatus 1. Particularly, the $\Sigma\Delta$ modulation algorithm is similar to the $\Delta\Sigma$ modulation algorithm in that it has the characteristics that the control input Ucain inverts at a higher frequency as the small deviation component value Ducain_L approaches more to zero, i.e., as the SLD control input Rsld less fluctuates due to the cam phase Cain approaching to the target cam phase Cain_cmd, so that it is possible to enhance the convergence of the cam phase Cain to the target cam phase Cain_cmd as compared with the use of the control input Ucain which is modulated by PWM or dither at a constant inversion frequency.

Figure 23:
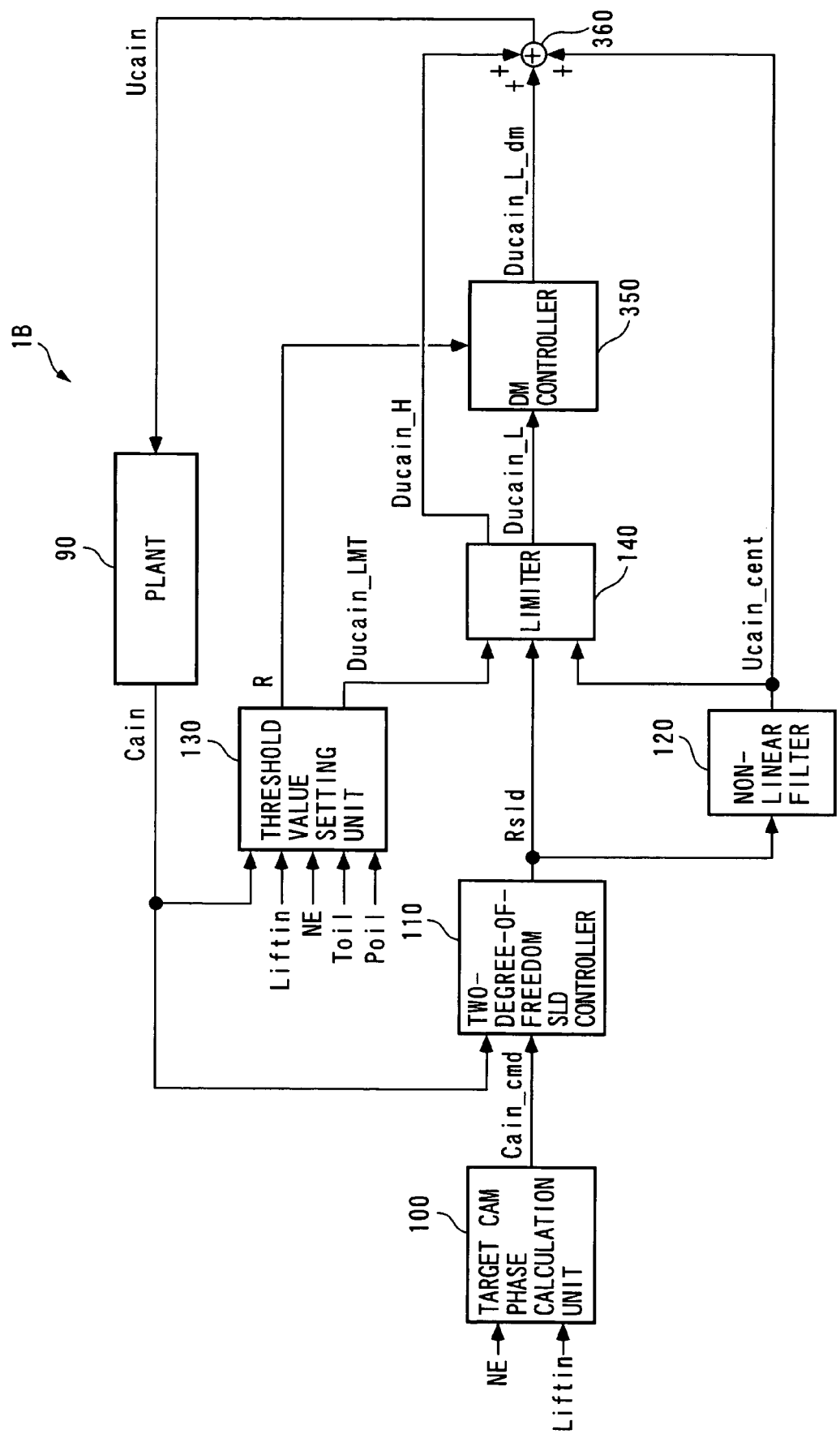
FIG. 23 is a block diagram generally illustrating the configuration of a control apparatus according to a third embodiment.

Next, a control apparatus 1B according to a third embodiment of the present invention will be described with reference to FIG. 23. In the following description, components identical to those in the first embodiment are designated the same reference numerals, and a description thereon is omitted. The control apparatus 1B of this embodiment also controls the cam phase Cain, but differs from the aforementioned first embodiment in that a DM controller 350 is provided instead of the DSM controller 150, and accordingly, an adder 360 calculates the control input Ucain in accordance with an algorithm different from that used by the adder 160.

The DM controller 350 calculates a modulated value Ducain_L_dm by modulating in accordance with an algorithm to which the $\Delta$ modulation algorithm is applied as shown in the following Equations (35)–(39):

$$r(k)=\text{Ducain\_L}(k) \quad (35)$$

$$\sigma u(k)=\sigma u(k-1)+u(k-1) \quad (36)$$

$$\delta(k)=r(k)-\sigma u(k) \quad (37)$$

$$u(k)=\text{fnl}(\delta(k)) \quad (38)$$

$$\text{Ducain\_L\_dm}(k)=u(k) \quad (39)$$

The adder 360 in turn calculates the control input Ucain in accordance with the following Equation (40):

$$\text{Ucain}=\text{Ducain\_L\_dm}+\text{Ducain\_H}+\text{Ucain\_cent} \quad (40)$$

According to the control apparatus 1B of the third embodiment as described above, since the DM controller 350 calculates the modulated value Ducain_L_dm which is then used to calculate the control input Ucain, the control apparatus 1B can provide similar advantageous effects to those of the aforementioned control apparatus 1. Particularly, the $\Delta$ modulation algorithm is similar to the $\Delta\Sigma$ modulation algorithm in that it has the characteristics that the control input Ucain inverts at a higher frequency as the small deviation component value Ducain_L approaches more to zero, i.e., as the SLD control input Rsld less fluctuates due to the cam phase Cain approaching more to the target cam phase Cain_cmd, so that it is possible to enhance the convergence of the cam phase Cain to the target cam phase Cain_cmd as compared with the use of the control input Ucain which is modulated by PWM or dither at a constant inversion frequency.

While the foregoing respective embodiments represent examples of calculating the control input Ucain by modulating a control value in accordance with an algorithm to which the $\Delta\Sigma$ modulation algorithm, the $\Sigma\Delta$ modulation algorithm, and the $\Delta$ modulation algorithm, the modulation algorithm for use in the calculation of the control input is not limited to them, but any modulation algorithm may be applied as long as it can calculate a control input by modulating a control value. For example, a PWM (Pulse Width Modulation) algorithm, or an algorithm for modulating a control value by dithering may be employed as the modulation algorithm.

What is claimed is:

1. A control apparatus for controlling a control amount for a plant in response to a control input, comprising:

control amount detecting means for detecting the control amount;

target value setting means for setting a target value for the control amount;

control value calculating means for calculating a control value for controlling the detected control amount to bring the same to the set target value based on a predetermined control algorithm; and control input calculating means for calculating the control input by modulating the calculated control value in accordance with an algorithm to which a predetermined modulation algorithm is applied, said control input calculating means including amplitude setting means for setting the amplitude of the control input in accordance with a parameter representative of the state of said plant.

2. A control apparatus according to claim 1, wherein said control input calculating means further includes center value setting means for setting a center value located at the center of the amplitude of the control input in accordance with the control value.

3. A control apparatus according to claim 1, wherein said predetermined modulation algorithm is any of a $\Delta\Sigma$ modulation algorithm, a $\Sigma\Delta$ modulation algorithm, and a $\Delta$ modulation algorithm.

4. A control apparatus for controlling a cam phase of at least one of an intake cam and an exhaust cam in an internal combustion engine relative to a crank shaft through a cam phase varying mechanism, said control apparatus comprising:

cam phase detecting means for detecting the cam phase;

target cam phase setting means for setting a target cam phase for the cam phase;

control value calculating means for calculating a control value for controlling the detected cam phase to bring the same to the set target cam phase based on a predetermined control algorithm; and control input calculating means for calculating a control input to said cam phase varying means by modulating the calculated control value in accordance with an algorithm to which a predetermined modulation algorithm is applied, said control input calculating means including an amplitude setting means for setting the amplitude of the control input in accordance with an operating condition parameter representative of an operating condition of said internal combustion engine.

5. A control apparatus according to claim 4, wherein:

said internal combustion engine comprises a variable valve lift mechanism for changing a lift of a valve which is driven to open and close by at least one of said intake cam and said exhaust cam for which the cam phase is controlled, and said amplitude setting means sets the amplitude of the control input in accordance further with the lift of the valve.

6. A control apparatus according to claim 4 or 5, wherein said control input calculating means further includes center value setting means for setting a center value located at the center of the amplitude of the control input in accordance with the control value.

7. A control apparatus according to claim 4 or 5, wherein said predetermined modulation algorithm is any of a $\Delta\Sigma$ modulation algorithm, a $\Sigma\Delta$ modulation algorithm, and a $\Delta$ modulation algorithm.

* * * * *